(12) United States Patent
Mori et al.

(10) Patent No.: US 8,972,124 B2
(45) Date of Patent: Mar. 3, 2015

(54) WORK VEHICLE

(71) Applicant: Komatsu Ltd., Tokyo (JP)

(72) Inventors: Tadashi Mori, Hirakata (JP); Jin Yogita, Hirakata (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 14/126,948

(22) PCT Filed: Jul. 22, 2013

(86) PCT No.: PCT/JP2013/069742
§ 371 (c)(1),
(2) Date: Dec. 17, 2013

(65) Prior Publication Data
US 2015/0025753 A1   Jan. 22, 2015

(51) Int. Cl.
*F02D 41/00* (2006.01)
*E02F 9/20* (2006.01)
*E02F 9/26* (2006.01)
*F02D 17/00* (2006.01)

(52) U.S. Cl.
CPC ............... *E02F 9/2066* (2013.01); *E02F 9/26* (2013.01); *F02D 17/00* (2013.01)
USPC ............ 701/50; 123/339.1; 60/431; 60/420; 60/442; 60/459; 91/461; 91/431

(58) Field of Classification Search
USPC ................ 60/431, 420, 442, 459; 123/339.1; 91/461, 431; 701/50
See application file for complete search history.

(56) References Cited

U.S. PATENT DOCUMENTS 118,084 A1   6/2006  Asakage
253,633 A1  10/2012  Anzawa

FOREIGN PATENT DOCUMENTS

| JP | 60-113042 A   | 6/1985  |
|----|---------------|---------|
| JP | 2000-018060 A | 1/2000  |
| JP | 2002-021690 A | 1/2002  |
| JP | 2004-150305 A | 5/2004  |
| JP | 2004-150360 A | 5/2004  |
| JP | 2004-251278 A | 9/2004  |
| JP | 2004-263574 A | 9/2004  |
| JP | 2004-339956 A | 12/2004 |
| JP | 2006-152865 A | 6/2006  |
| JP | 2008-026241   | 2/2008  |
| JP | 2010-223164 A | 10/2010 |
| JP | 2011-185220 A | 9/2011  |
| JP | 2012-215076 A | 11/2012 |

*Primary Examiner* — Adam Tissot
(74) *Attorney, Agent, or Firm* — Drinker Biddle & Reath LLP

(57) ABSTRACT

A work vehicle includes an engine, an idling stop execution portion, a determination portion, a counting portion, and an idling stop time period adjustment portion. The engine can rotate in a first idling state and a second idling state in which the engine rotates at the number of rotations higher than a prescribed number of rotations. The idling stop execution portion performs an idling stop operation for stopping the engine. The determination portion determines whether or not stop has been made from the second idling state. The counting portion counts the number of times of stop of the engine from the second idling state. An idling stop time period adjustment portion makes a prescribed time period of the second idling state longer than a current time period, when the number of times of stop of the engine is equal to or greater than the prescribed number of times.

12 Claims, 26 Drawing Sheets

FIG.13

| GUIDANCE | MESSAGE CONTENTS |
|---|---|
| L1 | THE NUMBER OF TIMES OF STOP FROM HIGH IDLING STATE HAS ATTAINED TO X. AFTER WORKING ENDS, PLEASE CARRY OUT ENGINE CHECK AND MAINTENANCE AS NECESSARY. |
| L2 | THE NUMBER OF TIMES OF STOP FROM HIGH IDLING STATE HAS ATTAINED TO X. AFTER WORKING ENDS, PLEASE CARRY OUT ENGINE CHECK AND MAINTENANCE. |
| L3 | THE NUMBER OF TIMES OF STOP FROM HIGH IDLING STATE HAS ATTAINED TO X. PLEASE STOP WORKING AND IMMEDIATELY CARRY OUT ENGINE CHECK AND MAINTENANCE. |

FIG.14
(A) 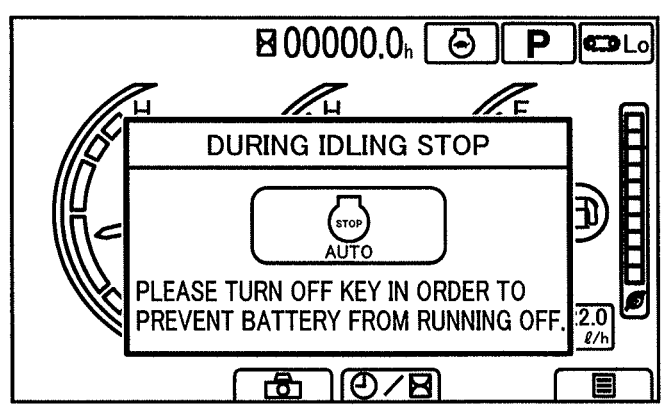
(B) 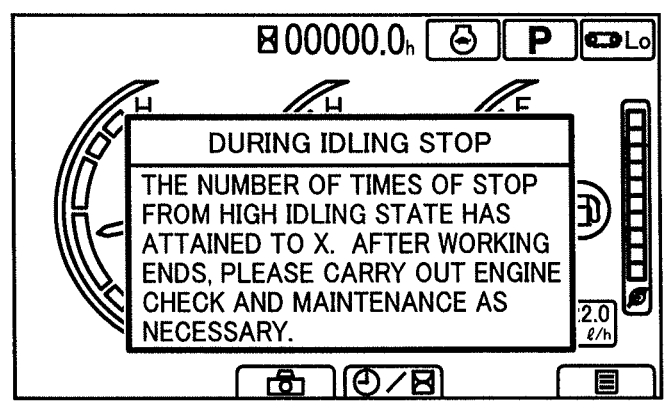

FIG.21

| GUIDANCE | MESSAGE CONTENTS |
|---|---|
| L1 | THE NUMBER OF TIMES OF STOP FROM HIGH IDLING STATE HAS ATTAINED TO X. AFTER WORKING ENDS, PLEASE CARRY OUT ENGINE CHECK AND MAINTENANCE AS NECESSARY. |
| L2 | THE NUMBER OF TIMES OF STOP FROM HIGH IDLING STATE HAS ATTAINED TO X. AFTER WORKING ENDS, PLEASE CARRY OUT ENGINE CHECK AND MAINTENANCE. |
| L3 | THE NUMBER OF TIMES OF STOP FROM HIGH IDLING STATE HAS ATTAINED TO X. PLEASE STOP WORKING AND IMMEDIATELY CARRY OUT ENGINE CHECK AND MAINTENANCE. |
| L4 | TURNING ON OF DECELERATION SWITCH IS RECOMMENDED. |
| L5 | PLEASE TURN ON DECELERATION SWITCH. |

FIG.22
(A)
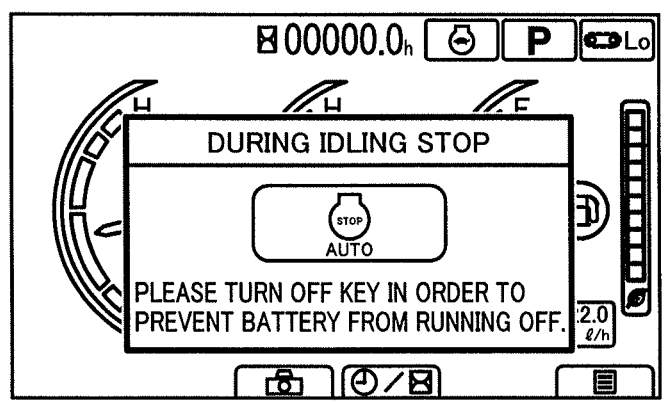
(B)
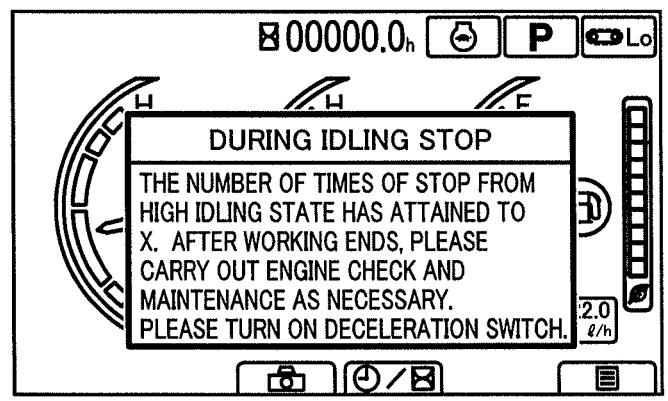

WORK VEHICLE

TECHNICAL FIELD

The present invention relates to a work vehicle and particularly to an idling stop function.

BACKGROUND ART

Recently, for energy saving and environmental conservation, incorporation of an idling stop function in such a work vehicle as a hydraulic excavator has been demanded. The idling stop function refers to a function to automatically stop an engine when an idling state of a work vehicle has continued for a prescribed time period. The idling state means a state that a work vehicle stands by while an engine remains operating.

In general, since the idling stop function is a function for automatically stopping an engine, the number of times of stop of the engine increases.

In this connection, Japanese Patent Laying-Open No. 2004-251278 has proposed such a scheme that the number of times of stop of an engine is counted in order to ascertain load imposed on the engine, and based on a result of counting, an idling stop function is inactivated when the number of times of stop of the engine has exceeded the upper limit number of times which serves as a threshold value. Thus, the number of times of stop of the engine with the idling stop function is suppressed and load imposed on the engine can be mitigated.

CITATION LIST

Patent Document

PTD 1: Japanese Patent Laying-Open No. 2004-251278

SUMMARY OF INVENTION

Technical Problem

On the other hand, in such a work vehicle as a hydraulic excavator, output from an engine is distributed to a travel implement and a work implement, and the work vehicle has a special construction different from a construction of other general vehicles. Namely, the work vehicle should carry out working by driving a work implement also in a non-traveling state. Therefore, the work vehicle is configured to be able to stand by not only in an idling state at a low number of rotations but also in an idling state at a high number of rotations with regard to the number of rotations in the idling state of the engine, such that stable drive of a work implement is enabled even in a non-traveling stage (a stop state).

In general, when the idling stop function is activated in the idling state at the high number of rotations, that is, while the engine maintains the high number of rotations, load can be imposed on the engine.

In this connection, the publication above shows such a scheme that the number of times of stop in all situations of engine stop is counted, regardless of a situation where load imposed on the engine is low or high, which is a scheme including also the number of times of stop of the engine in a situation where load imposed on the engine is low. Namely, in the scheme for counting the number of times of stop of the engine described in the publication above, information unnecessary for ascertaining a degree of actual load imposed on the engine is also included, and the scheme was insufficient in terms of ascertainment of a degree of load imposed on the engine.

The present invention was made in order to solve the problems as described above, and an object of the present invention is to provide a work vehicle capable of achieving improved durability of an engine, by accurately ascertaining a degree of load imposed on the engine.

Other tasks and novel features will become apparent from the description herein and the attached drawings.

Solution to Problem

A work vehicle according to one aspect of the present invention includes an engine, an idling stop execution portion, a determination portion, a counting portion, and an idling stop time period adjustment portion. The engine is capable of rotating in a first idling state in which the engine rotates at a prescribed number of rotations and a second idling state in which the engine rotates at the number of rotations higher than the prescribed number of rotations. The idling stop execution portion performs an idling stop operation for stopping the engine when the first idling state or the second idling state has continued for a prescribed time period. The determination portion determines whether or not stop has been made from the second idling state by the idling stop operation, based on rotation information on the number of rotations of the engine. The counting portion counts the number of times of stop of the engine from the second idling state, based on a result of determination by the determination portion. An idling stop time period adjustment portion makes the prescribed time period of the second idling state, which is a condition for performing the idling stop operation, longer than a current time period, when the number of times of stop of the engine counted by the counting portion is equal to or greater than a prescribed number of times.

According to the work vehicle of the present invention, the number of times of stop of the engine from the second idling state by the idling stop operation is counted, based on the rotation information on the number of rotations of the engine. Thus, since the number of times of stop of the engine in such a situation that load is high can be counted with the number of times of stop of the engine in such a situation that load imposed on the engine is low being excluded, a degree of load imposed on the engine can accurately be ascertained. Then, a prescribed time period which is a condition for performing the idling stop operation can be made longer in accordance with the degree of load. Thus, the number of times of stop of the engine can be suppressed, load imposed on the engine can be mitigated, and durability of the engine can be improved.

Preferably, the determination portion determines whether or not the engine has stopped from the second idling state by the idling stop operation, based on whether or not an indication value in accordance with an amount of operation of an adjustment dial with which the number of rotations of the engine can be adjusted has exceeded a prescribed value.

According to the above, since it can be determined that the engine is stopped from the second idling state based on an indication value in accordance with the adjustment dial, it is not necessary to determine the number of rotations by providing a sensor, so that processing load can be mitigated and determination can be made with a simplified scheme.

Preferably, the work vehicle further includes an idling stop time period setting portion. The idling stop time period setting portion sets the prescribed time period from a setting range from which selective setting can be made. The idling stop time period adjustment portion sets the prescribed time period to a longest time period within the setting range when the number of times of stop of the engine counted by the counting portion is equal to or greater than the prescribed number of times.

According to the above, since the prescribed time period is set to the longest time period, the number of times of stop of the engine can effectively be suppressed, load imposed on the engine can be mitigated, and durability of the engine can be improved.

Preferably, the work vehicle further includes a notification portion. The notification portion gives guidance information on the engine based on the number of times of stop of the engine counted by the counting portion.

According to the above, since guidance information on the engine is given, an operator can be notified of a degree of load imposed on the engine.

In particular, the notification portion gives the guidance information with contents thereof being changed in accordance with increase in the number of times of stop of the engine counted by the counting portion.

According to the above, by giving the guidance information with contents thereof being changed in accordance with increase in the number of times of stop of the engine, notification can be given to an operator in an appropriate form, in accordance with a degree of load imposed on the engine.

Preferably, the work vehicle includes a deceleration execution portion and a deceleration setting portion. The deceleration execution portion performs a deceleration operation for setting the number of rotations of the engine to the number of rotations lower than in the second idling state in accordance with continuation of a non-working state. The deceleration setting portion is capable of setting a function of the deceleration operation to active or inactive. The determination portion determines whether or not the engine has stopped from the second idling state by the idling stop operation, based on rotation information on the number of rotations of the engine, when the deceleration setting portion has set the function of the deceleration operation to inactive.

According to the above, when the function of the deceleration operation is set to inactive, whether or not to stop the engine from the second idling state is determined based on rotation information on the number of rotations of the engine. Namely, when the function of the deceleration operation is active, it is not necessary to make determination making use of the rotation information on the number of rotations of the engine and processing for determining the idling state can be performed faster.

In particular, the deceleration setting portion sets the function of the deceleration operation to active when the number of times of stop of the engine counted by the counting portion has exceeded the prescribed number of times.

According to the above, by setting the function of the deceleration operation to active, stop of the engine from the second idling state can be suppressed, load imposed on the engine can be mitigated, and durability of the engine can be improved.

A work vehicle according to another aspect of the present invention includes an engine, a deceleration execution portion, an idling stop execution portion, a deceleration setting portion, a determination portion, a counting portion, and an idling stop time period adjustment portion. The engine is capable of rotating in a first idling state in which the engine rotates at a prescribed number of rotations and a second idling state in which the engine rotates at the number of rotations higher than the prescribed number of rotations. The deceleration execution portion performs a deceleration operation for setting the number of rotations of the engine to the number of rotations in the first idling state in accordance with continuation of a non-working state. The idling stop execution portion performs an idling stop operation for stopping the engine when the first idling state or the second idling state has continued for a prescribed time period. The deceleration setting portion is capable of setting a function of the deceleration operation to active or inactive. The determination portion determines whether or not the engine has been stopped by the idling stop operation, when the function of the deceleration operation has been set to inactive by the deceleration setting portion. The counting portion counts the number of times of stop of the engine from the second idling state, based on a result of determination by the determination portion. An idling stop time period adjustment portion makes the prescribed time period of the second idling state, which is a condition for performing the idling stop operation, longer than a current time period, when the number of times of stop of the engine counted by the counting portion is equal to or greater than a prescribed number of times.

According to the work vehicle of the present invention, the number of times of stop of the engine from the second idling state by the idling stop operation in a case where the function of the deceleration operation has been set to inactive is counted. Thus, since the number of times of stop of the engine in such a situation that load is high can be counted with the number of times of stop of the engine in such a situation that load imposed on the engine is low being excluded, a degree of load imposed on the engine can accurately be ascertained. Then, a prescribed time period which is a condition for performing the idling stop operation is made longer in accordance with the degree of load. Thus, the number of times of stop of the engine can be suppressed, load imposed on the engine can be mitigated, and durability of the engine can be improved.

Preferably, the work vehicle further includes an idling stop time period setting portion. The idling stop time period setting portion sets the prescribed time period from a setting range from which selective setting can be made. The idling stop time period adjustment portion sets the prescribed time period to a longest time period within the setting range when the number of times of stop of the engine counted by the counting portion is equal to or greater than the prescribed number of times.

According to the above, since the prescribed time period is set to the longest time period, the number of times of stop of the engine can effectively be suppressed, load imposed on the engine can be mitigated, and durability of the engine can be improved.

Preferably, the work vehicle further includes a notification portion. The notification portion gives guidance information based on the number of times of stop of the engine counted by the counting portion.

According to the above, since guidance information on the engine is given, an operator can be notified of a degree of load imposed on the engine.

In particular, the notification portion gives the guidance information with contents thereof being changed in accordance with increase in the number of times of stop of the engine counted by the counting portion.

According to the above, by giving the guidance information with contents thereof being changed in accordance with increase in the number of times of stop of the engine, notification can be given to an operator in an appropriate form, in accordance with a degree of load imposed on the engine.

Preferably, the deceleration setting portion sets the function of the deceleration operation to active when the number of times of stop of the engine counted by the counting portion has exceeded the prescribed number of times.

According to the above, by setting the function of the deceleration operation to active, stop of the engine from the second idling state can be suppressed, load imposed on the engine can be mitigated, and durability of the engine can be improved.

Advantageous Effects of Invention

As described above, the work vehicle according to the present invention can accurately ascertain a degree of load imposed on the engine and can achieve improved durability of the engine.

BRIEF DESCRIPTION OF DRAWINGS

FIG. 13 is a diagram illustrating guidance information based on the first embodiment.

FIG. 14 is a diagram illustrating an example of display on monitor apparatus 21 in accordance with the guidance information based on the first embodiment.

FIG. 21 is a diagram illustrating guidance information based on the second embodiment.

FIG. 22 is a diagram illustrating an example of display on monitor apparatus 21 in accordance with the guidance information based on the second embodiment.

DESCRIPTION OF EMBODIMENTS

An embodiment of the present invention will be described hereinafter with reference to the drawings.

First Embodiment

Overall Construction

Figure 1:
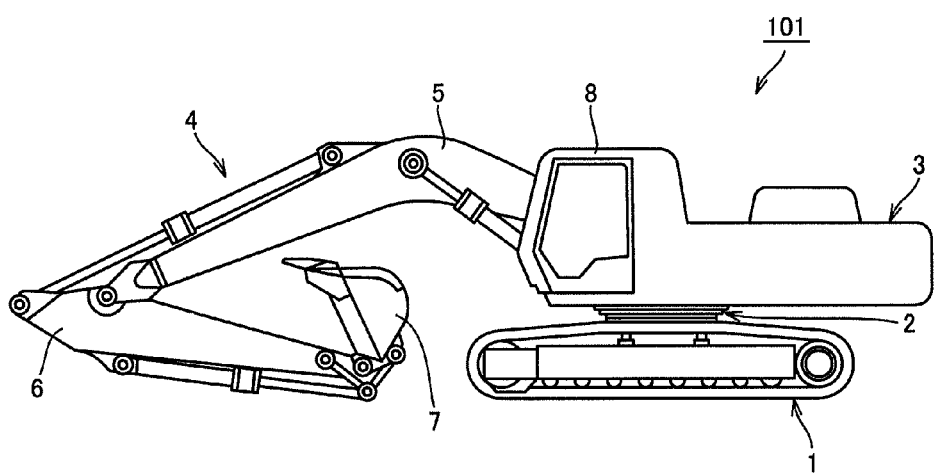
FIG. 1 is a diagram illustrating appearance of a work vehicle 101 based on a first embodiment.

FIG. 1 is a diagram illustrating appearance of a work vehicle 101 based on a first embodiment.

As shown in FIG. 1, in the present example, a hydraulic excavator will mainly be described by way of example as work vehicle 101 based on the first embodiment.

Work vehicle 101 mainly includes a lower carrier 1, an upper revolving unit 3, and a work implement 4. A work vehicle main body is constituted of lower carrier 1 and upper revolving unit 3. Lower carrier 1 has a pair of left and right crawler belts. Upper revolving unit 3 is attached revolvably to an upper portion of lower carrier 1, with a revolving mechanism 2 being interposed.

Work implement 4 is pivotably supported by upper revolving unit 3 in a manner movable in a vertical direction and performs such working as excavation of soil. Work implement 4 includes a boom 5, an arm 6, and a bucket 7. Boom 5 has a root portion movably coupled to upper revolving unit 3. Arm 6 is movably coupled to a tip end of boom 5. Bucket 7 is movably coupled to a tip end of arm 6. In addition, upper revolving unit 3 includes an operator's cab 8 or the like.

<Construction of Operator's Cab>

Figure 2:
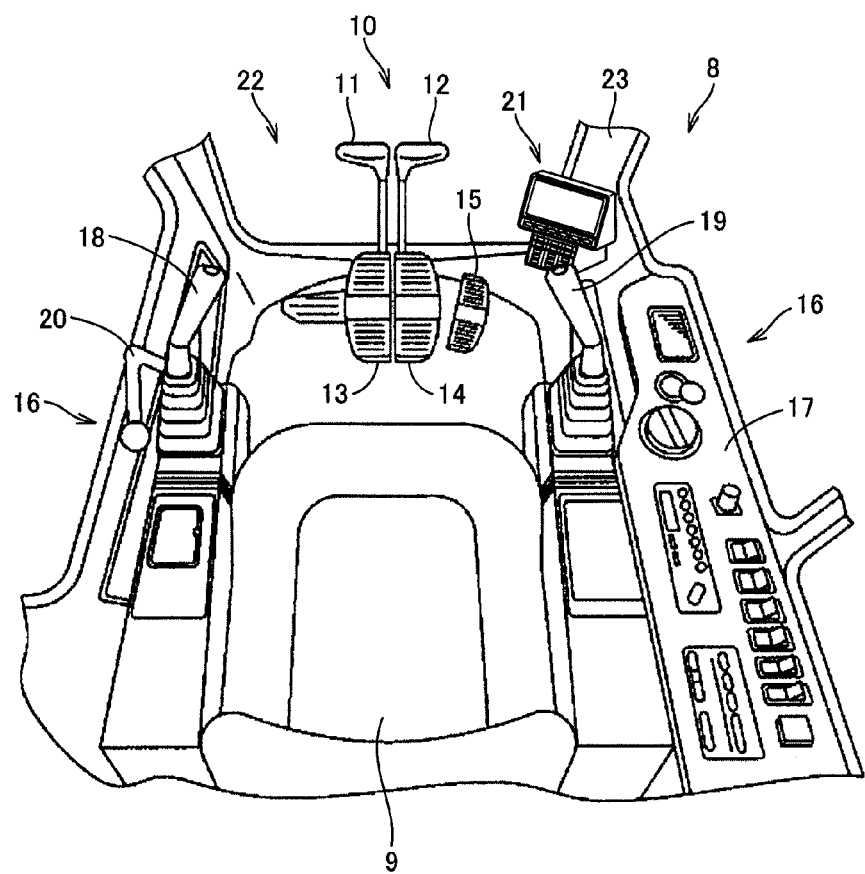
FIG. 2 is a perspective view showing an internal construction of an operator's cab 8 based on the first embodiment.

FIG. 2 is a perspective view showing an internal construction of operator's cab 8 based on the first embodiment.

As shown in FIG. 2, operator's cab 8 has an operator's seat 9, a travel operation portion 10, a pedal for attachment 15, a side window 16, a dashboard 17, work implement levers 18, 19, a locking lever 20, a monitor apparatus 21, a front window 22, and a vertical frame 23.

Operator's seat 9 is provided in a central portion of operator's cab 8. Travel operation portion 10 is provided in front of operator's seat 9.

Travel operation portion 10 includes travel levers 11, 12 and travel pedals 13, 14. Travel pedals 13, 14 are movable together with respective travel levers 11, 12. Lower carrier 1 moves forward as the operator pushes forward travel lever 11, 12. Alternatively, lower carrier 1 moves backward as the operator pulls backward travel lever 11, 12.

Pedal for attachment 15 is provided in the vicinity of travel operation portion 10. In addition, dashboard 17 is provided in the vicinity of right side window 16 in FIG. 2.

Work implement levers 18, 19 are provided in left and right portions of operator's seat 9, respectively. Work implement lever 18, 19 serves to carry out vertical movement of boom 5, pivot of arm 6 and bucket 7, a revolving operation of upper revolving unit 3, and the like.

Locking lever 20 is provided in the vicinity of work implement lever 18. Here, locking lever 20 serves to stop such functions as operation of work implement 4, revolution of upper revolving unit 3, and travel of lower carrier 1. Namely, by performing an operation for positioning locking lever 20 in a horizontal state (here, an operation for pulling up the locking lever), movement of work implement 4 or the like can be locked (restricted). In a state where locking lever 20 has locked movement of work implement 4 or the like, work implement 4 or the like does not operate in spite of an operation of work implement lever 18, 19 by the operator. In addition, similarly, even though travel lever 11, 12 and travel pedal 13, 14 are operated, lower carrier 1 does not operate.

Monitor apparatus 21 is provided in a lower portion of vertical frame 23 which is a partition between front window 22 and one side window 16 of operator's cab 8 and it displays an engine state of work vehicle 101, guidance information, or the like. In addition, monitor apparatus 21 is provided to be able to accept a setting instruction as to various operations of work vehicle 101.

Here, an engine state refers, for example, to a temperature of an engine coolant, a temperature of hydraulic oil, an amount of remaining fuel, and the like. Guidance information includes an indication and the like inviting check and maintenance of the engine of the work vehicle, by way of example. Various operations refer to setting of an operation mode, setting about idling stop control, and the like.

<Configuration of Control System>

Figure 3:
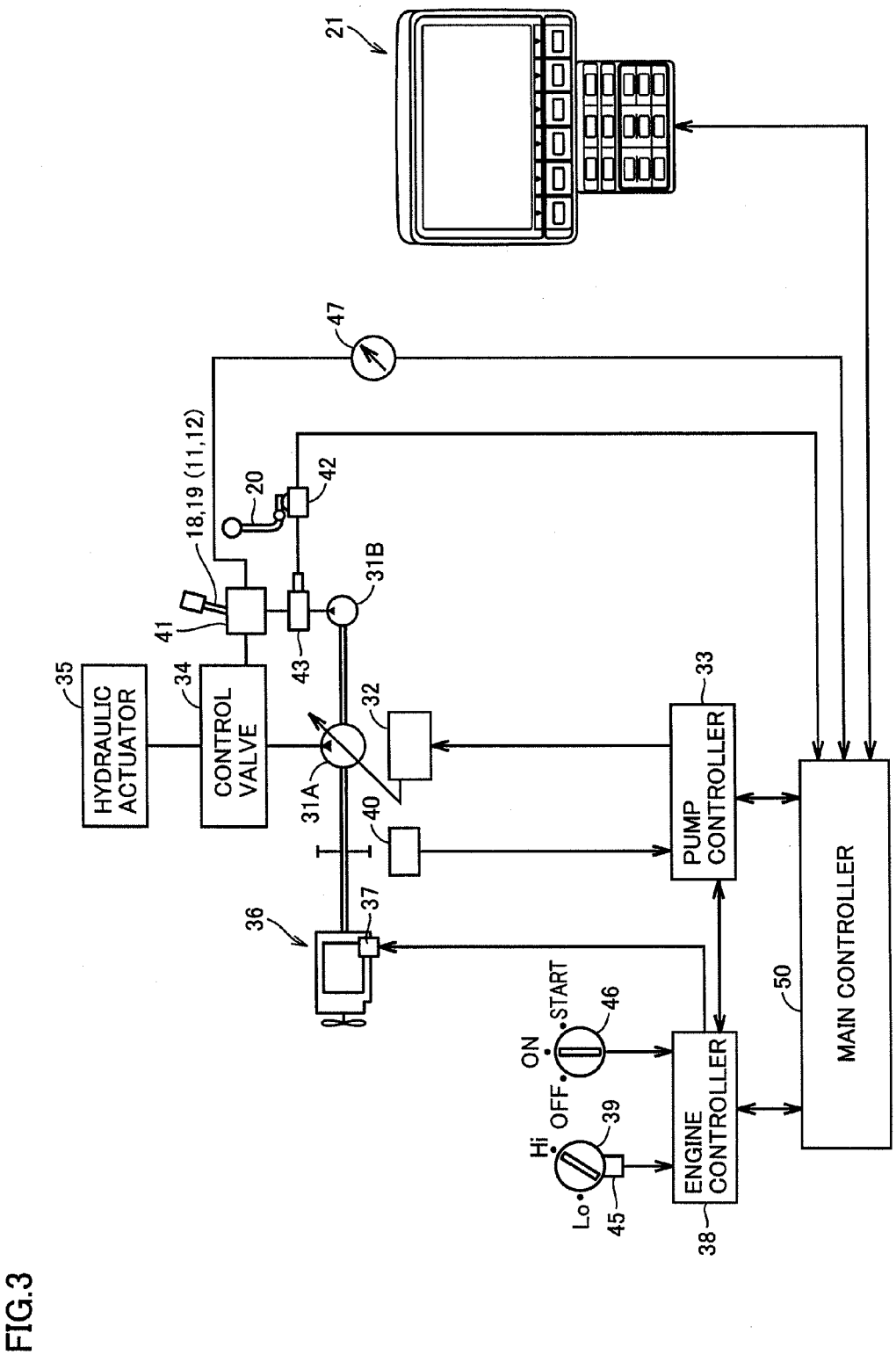
FIG. 3 is a simplified diagram showing a configuration of a control system of work vehicle 101 based on the first embodiment.

FIG. 3 is a simplified diagram showing a configuration of a control system of work vehicle 101 based on the first embodiment.

As shown in FIG. 3, the control system of work vehicle 101 includes, by way of example, work implement lever 18, 19 and travel lever 11, 12, locking lever 20, monitor apparatus 21, a first hydraulic pump 31A, a second hydraulic pump 31B, a swash plate drive apparatus 32, a pump controller 33, a control valve 34, a hydraulic actuator 35, an engine 36, a governor motor 37, an engine controller 38, a fuel dial 39, a rotation sensor 40, a work implement lever apparatus 41, a PPC locking switch 42, a valve 43, a potentiometer 45, a starter switch 46, a pressure sensor 47, and a main controller 50.

First hydraulic pump 31A discharges pressure oil for generating a hydraulic pressure driving work implement 4 or the like.

Second hydraulic pump 31B discharges pressure oil for generating a hydraulic pressure in accordance with an operation of work implement lever 18, 19 and travel lever 11, 12. Swash plate drive apparatus 32 is connected to first hydraulic pump 31A.

Swash plate drive apparatus 32 drives based on an instruction from pump controller 33 and changes an angle of inclination of a swash plate of first hydraulic pump 31A. Hydraulic actuator 35 is connected to first hydraulic pump 31A with control valve 34 being interposed. Hydraulic actuator 35 is a cylinder for boom, a cylinder for arm, a cylinder for bucket, a hydraulic motor for revolution, a hydraulic motor for travel, and the like.

Control valve 34 is connected to work implement lever apparatus 41. Work implement lever apparatus 41 outputs to control valve 34, a pilot pressure in accordance with a direction of operation and/or an amount of operation of work implement lever 18, 19 and travel lever 11, 12. Control valve 34 controls hydraulic actuator 35 in accordance with the pilot pressure.

Work implement lever 18, 19 and travel lever 11, 12 as well as locking lever 20 are connected to second hydraulic pump 31B.

Pressure sensor 47 is connected to work implement lever apparatus 41. Pressure sensor 47 outputs to main controller 50, a lever operation signal in accordance with a state of operation of work implement lever 18, 19 and travel lever 11, 12.

In response to an instruction from main controller 50, pump controller 33 carries out such control that first hydraulic pump 31A absorbs best matching torque at each output point of engine 36, in accordance with pump absorption torque set in accordance with an amount of working, the number of rotations of the engine set with fuel dial 39 or the like, the actual number of rotations of the engine, and the like.

Engine 36 has a drive shaft connected to first hydraulic pump 31A and second hydraulic pump 31B. Governor motor 37 adjusts an amount of fuel injection by a fuel injection apparatus within engine 36.

Engine controller 38 controls an operation of engine 36. Engine 36 is a diesel engine by way of example. The number of engine rotations of engine 36 is set with fuel dial 39 or the like and the actual number of engine rotations is detected by rotation sensor 40. Rotation sensor 40 is connected to main controller 50.

Fuel dial 39 is provided with potentiometer 45, which detects an amount of operation of fuel dial 39 and outputs a value indicated by a dial (also referred to as a dial indication value) regarding the number of rotations of engine 36 to engine controller 38. A target number of rotations of engine 36 is adjusted in accordance with the dial indication value of fuel dial 39.

In response to an instruction from main controller 50, engine controller 38 gives an instruction to governor motor 37 based on a dial indication value regarding the number of rotations of engine 36 in accordance with an amount of operation from potentiometer 45, controls an amount of fuel injected by the fuel injection apparatus or the like, and adjusts the number of rotations of engine 36.

Starter switch 46 is connected to engine controller 38. As the operator operates starter switch 46 (sets the starter switch to start), a start signal is output to engine controller 38 so that engine 36 starts.

Main controller 50 is a controller controlling overall work vehicle 101, and it is configured with a CPU (Central Processing Unit), a non-volatile memory, a timer, and the like. Main controller 50 controls pump controller 33, engine controller 38, and monitor apparatus 21.

A dial indication value from fuel dial 39 and a start signal from starter switch 46 are input also to main controller 50 through engine controller 38. In the present example, for example, though a case where a dial indication value regarding the number of rotations of engine 36 is input to main controller 50 through engine controller 38 is described, limitation to such a scheme is not particularly intended, and for example, a configuration can also be such that a dial indication value from fuel dial 39 is directly input to main controller 50.

PPC locking switch 42 is connected to locking lever 20. PPC locking switch 42 senses an operation of locking lever 20 when it is operated toward a locking side, and sends a signal to valve (solenoid valve) 43. In addition, PPC locking switch 42 sends a similar signal also to main controller 50. Thus, such functions as operation of work implement 4, revolution of upper revolving unit 3, and travel of lower carrier 1 can be stopped. Then, in response to sensing of a signal from PPC locking switch 42 to main controller 50, that is, operation of locking lever 20 toward the locking side, control for an idling stop operation is started.

<Monitor Apparatus>

A configuration of monitor apparatus 21 will now be described.

Figure 4:
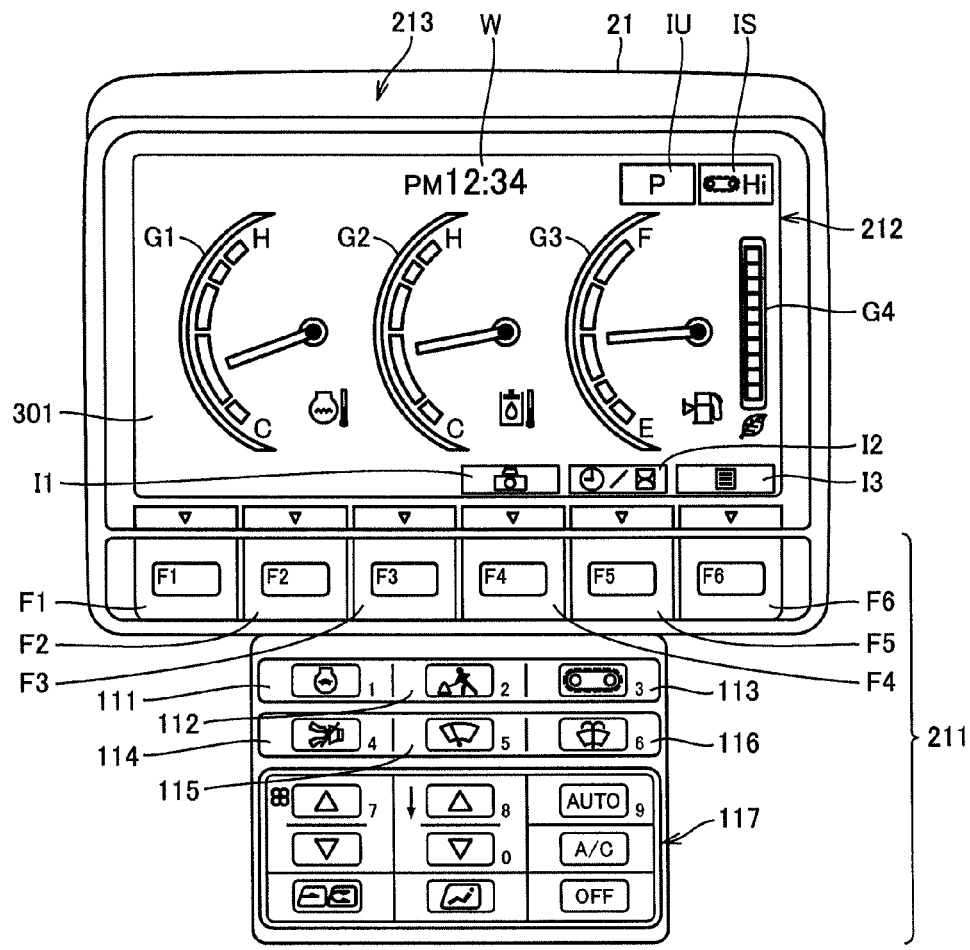
FIG. 4 is a diagram illustrating a configuration of a monitor apparatus 21 based on the first embodiment.

FIG. 4 is a diagram illustrating a configuration of monitor apparatus 21 based on the first embodiment.

As shown in FIG. 4, monitor apparatus 21 includes an input portion 211, a display portion 212, and a display control unit 213.

Input portion 211 accepts input of various types of information. Monitor apparatus 21 is connected to main controller 50, and input accepted at input portion 211 is output to main controller 50.

Display portion 212 is implemented by a liquid crystal screen or the like.

Display control unit 213 controls display contents on display portion 212. Specifically, display control unit 213 provides display of information on an operation of work vehicle 101 in response to an instruction from main controller 50. The information includes information on an engine state or guidance information.

Input portion 211 will specifically be described. Input portion 211 is constituted of a plurality of switches. Input portion 211 has function switches F1 to F6.

Function switches F1 to F6 are located in a lower portion of display portion 212 and displayed as "F1" to "F6", respectively. They are switches each for inputting a signal corresponding to an icon displayed on display portion 212 above each switch (by way of example, guidance icons I1 to I3).

In addition, input portion 211 has a deceleration switch 111, an operation mode selection switch 112, a travel speed position selection switch 113, a buzzer cancellation switch 114, a wiper switch 115, a washer switch 116, and an air-conditioner switch 117, provided under function switches F1 to F6.

Deceleration switch 111 is a switch for carrying out deceleration control for lowering the number of engine rotations of engine 36 to a prescribed number of rotations a prescribed time period after work implement lever 18, 19 returned to a neutral position. The "neutral position" refers to a state that work implement lever 18, 19 is not operated (a non-working state) and specifically to work implement lever 18, 19 being located at an initial position.

Operation mode selection switch 112 is a switch for selecting an operation mode of work vehicle 101 from among a plurality of operation modes. Travel speed position selection switch 113 is a switch for selecting a travel speed position of work vehicle 101 from among a plurality of travel speed positions. Buzzer cancellation switch 114 is a switch for cancelling buzzer sound generated at the time when work vehicle 101 is in a prescribed warning condition. Wiper switch 115 is a switch for operating a wiper (not shown) provided in a windshield of operator's cab 8 (see FIG. 2) of work vehicle 101. Washer switch 116 is a switch for actuating a washer (not shown) for injecting cleaning water toward the windshield. Air-conditioner switch 117 is a switch for operating various functions of an air-conditioner within operator's cab 8.

It is noted that a touch panel of a resistive film type or the like is also applicable as input portion 211. In the present example, a case where work vehicle 101 displays a standard picture 301 displayed during a normal operation as a picture displayed on display portion 212 is shown.

Standard picture 301 is generated by display control unit 213 based on data for displaying a picture, which is stored in advance in a not-shown memory. This is also the case with other pictures.

In standard picture 301, an engine water temperature gauge G1, a hydraulic oil temperature gauge G2, and a fuel level gauge G3 are displayed as aligned, and a pointer of a gauge changes based on a sensor signal from each corresponding sensor. In addition, a fuel consumption gauge G4 is displayed on the right of fuel level gauge G3.

A clock W is displayed in an upper central portion of display portion 212. On the right of clock W, an operation mode icon IU indicating a set operation mode and a travel speed position icon IS indicating a set travel speed position are displayed.

In standard picture 301, a character "P" is displayed as operation mode icon IU. This is an indication of a case where an operation mode is set to a power mode made use of in normal excavation working or the like.

In contrast, in a case where work vehicle 101 is set to an economy mode, it is assumed that a character "E" is displayed as operation mode icon IU.

In addition, in standard picture 301, an icon including such a character string as "Hi" is displayed as travel speed position icon IS.

This icon is an indication of a case where a travel speed position is set to high. A travel speed position selected and input through travel speed position selection switch 113 includes three types of low, intermediate, and high.

Among these, when a low speed is selected, an icon including a character string "Lo" is displayed as travel speed position icon IS. Alternatively, when an intermediate speed is selected, an icon including a character string "Mi" is displayed as travel speed position icon IS.

At a position in a lower portion of standard picture 301 and above function switches F4 to F6, guidance icons I1 to I3 corresponding to function switches F4 to F6, respectively, are displayed.

Guidance icon I1 is an icon meaning switching of a picture displayed on display portion 212 to a camera screen. The camera screen is a screen output by means of an image signal obtained by a CCD camera or the like (not shown) installed on the exterior of work vehicle 101 and shooting an outside world of work vehicle 101. Guidance icon I2 is an icon meaning switching of display of clock W to display of a service meter. Guidance icon I3 is an icon meaning switching of a picture displayed on display portion 212 to a user mode picture. Therefore, for example, when function switch F4 corresponding to guidance icon I1 is pressed, a picture displayed on display portion 212 is switched to a camera screen.

Figure 5:
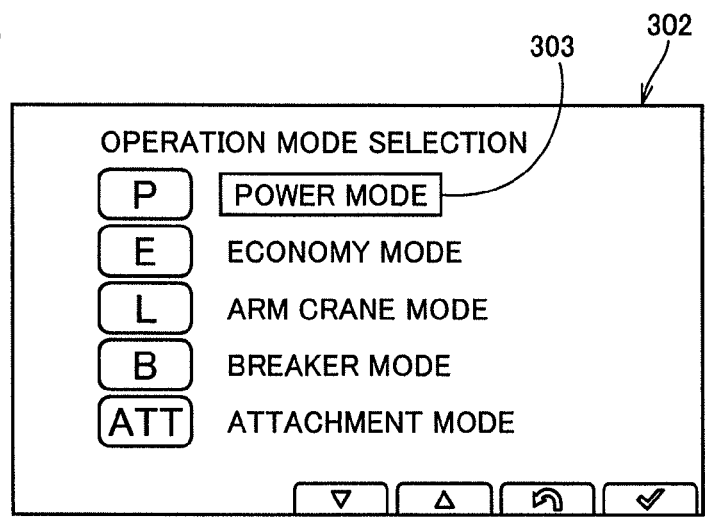
FIG. 5 is a diagram illustrating one example of an operation mode selection picture based on the first embodiment.

FIG. 5 is a diagram illustrating one example of an operation mode selection picture based on the first embodiment.

As shown in FIG. 5, an operation mode selection picture 302 is displayed as a result of transition from standard picture 301, in response to selection of operation mode selection switch 112.

In the present example, by way of example, icons including characters of "P" representing a P mode (a power mode), "E" representing an E mode (an economy mode), "L" representing an L mode (an arm crane mode: a load-suspending mode), "B" representing a B mode (a breaker mode), and "ATT" representing an ATT mode (an attachment mode), respectively, are displayed, and a name of each mode is displayed on the right. The P mode and the E mode are modes at the time of carrying out normal excavation working or the like, and the E mode is lower in maximum output of engine 36 than the P mode. The L mode is a delicate operation mode for slow movement with the number of engine rotations being suppressed (at an intermediate speed), such as an arm crane operation for lifting loads suspended from a hook. The B mode is a mode for working in which a breaker for crushing rocks or the like is attached as an attachment and the number of engine rotations is set to an intermediate or high speed during working. The ATT mode is a mode for working in which the number of engine rotations is in between intermediate and high speeds, and it is a spare mode in a case of attaching such a special attachment as a grapple. It is noted that a case where a cursor 303 is displayed at a position selecting the power mode is shown. For example, when the icon of the L mode is selected in response to an operation instruction from input portion 211, the character of the arm crane mode is highlighted and that mode will be in the selected state. Selection of the operation mode has engine controller 38 control a range of the number of rotations of engine 36.

<Idling Stop Function>

Figure 6:
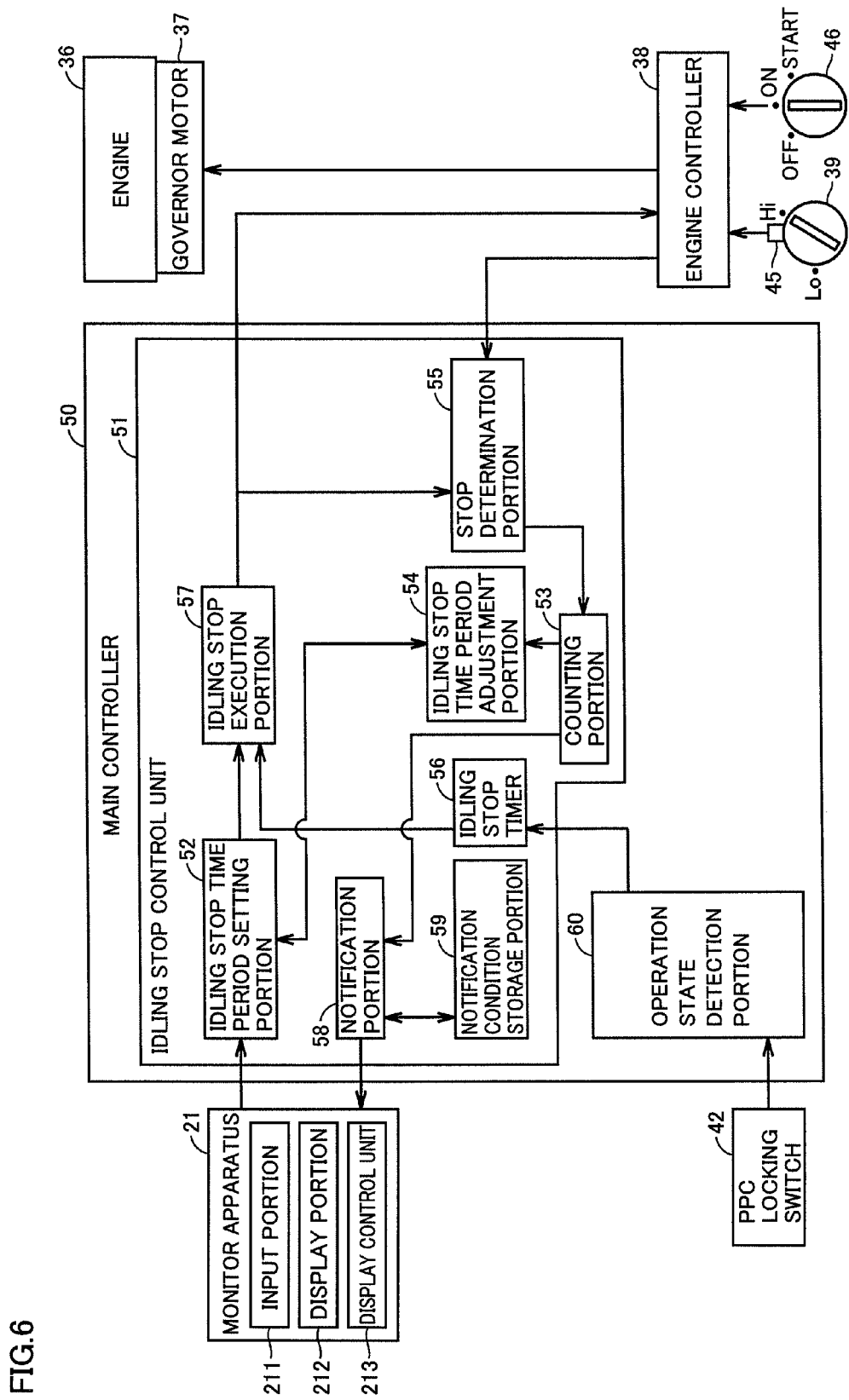
FIG. 6 is a functional block diagram illustrating an idling function of a main controller 50 in the control system of work vehicle 101 based on the first embodiment.

FIG. 6 is a functional block diagram illustrating an idling function of main controller 50 in the control system of work vehicle 101 based on the first embodiment.

As shown in FIG. 6, relation between main controller 50 and other peripheral devices is shown. Here, monitor apparatus 21, PPC locking switch 42, engine 36, governor motor 37, engine controller 38, fuel dial 39, potentiometer 45, and starter switch 46 are shown as the peripheral devices.

Main controller 50 includes an idling stop control unit 51 and an operation state detection portion 60.

Idling stop control unit 51 controls an idling stop operation. Operation state detection portion 60 detects a state of operation of various operation levers or the like.

Idling stop control unit 51 includes an idling stop time period setting portion 52, a counting portion 53, an idling stop time period adjustment portion 54, a stop determination portion 55, an idling stop timer 56, an idling stop execution portion 57, a notification portion 58, and a notification condition storage portion 59.

Idling stop execution portion 57 outputs an engine stop signal to engine controller 38 such that an idling stop operation for stopping engine 36 is performed when a prescribed condition is satisfied. The "idling stop operation" refers to an operation for stopping engine 36 in an idling state of the work vehicle, that is, a state in which the work vehicle stands by while engine 36 remains operating. This prescribed condition is a condition for performing the "idling stop operation," and it mainly refers to a condition relating to a prescribed time period during which the idling state of the work vehicle continues.

In the present example, the "prescribed time period" is also referred to as an idling stop time period.

Idling stop time period setting portion 52 sets an idling stop time period which is the condition for idling stop execution portion 57 in response to an instruction or the like from input portion 211 of monitor apparatus 21.

Idling stop timer 56 is a timer counting time in response to an instruction from operation state detection portion 60. Then, idling stop timer 56 outputs a result of counting to idling stop execution portion 57. Idling stop execution portion 57 determines whether or not an idling stop time period has elapsed based on a result of counting (a timer value) counted by idling stop timer 56, and when it has determined that the idling stop time period has elapsed, it outputs an engine stop signal to engine controller 38. Engine controller 38 instructs governor motor 37 to stop engine 36, in response to the engine stop signal from idling stop execution portion 57.

Stop determination portion 55 determines whether or not engine 36 stops from a high idling state in response to the engine stop signal output from idling stop execution portion 57. Here, the "high idling state" means an idling state in which the number of rotations of engine 36 is higher than a prescribed number of rotations. Specifically, stop determination portion 55 determines whether or not stop has been made from an idling state in which the number of rotations of engine 36 is higher than the prescribed number of rotations. More specifically, stop determination portion 55 determines whether or not stop has been made from the high idling state in response to the engine stop signal output from idling stop execution portion 57, for example, based on rotation information on the number of rotations of engine 36 input from engine controller 38. In the present embodiment, a dial indication value of fuel dial 39 with which a target number of rotations of engine 36 is set is used as rotation information on the number of rotations of engine 36. Stop determination portion 55 determines whether or not the dial indication value of fuel dial 39 has exceeded a prescribed threshold value (a prescribed value), and when the dial indication value has exceeded the prescribed value, it determines that engine 36 stops from the high idling state.

Here, the number of rotations at which load imposed on engine 36 at the time of stop of engine 36 is low is defined as the prescribed number of rotations. In the present example, 1000 rpm is set as one example of the prescribed number of rotations. It is noted that an idling state in which engine 36 rotates at the prescribed number of rotations is referred to as a "low idling state" and an idling state in which engine 36 rotates at the number of rotations higher than the prescribed number of rotations is referred to as a "high idling state." It is noted that the "low idling state" and the "high idling state" are examples of the "first idling state" and the "second idling state" in the present invention, respectively.

Then, a dial indication value in accordance with such an amount of operation of fuel dial 39 that the number of rotations of engine 36 attains to the prescribed number of rotations (1000 rpm) is set as a prescribed threshold value (a prescribed value) which serves as a criterion for determination as to whether or not engine 36 is in the high idling state. It is noted that, in such setting, a prescribed value can also be set with a margin being added. It is noted that a dial indication value and a threshold value (a prescribed value) may be any of an analog signal and a digital signal.

It is noted that a numeric value of the prescribed number of rotations is illustrated by way of example of the number of engine rotations at which load imposed on engine 36 is low and limitation to that numeric value is not particularly intended. A person skilled in the art could make change as appropriate as the number of engine rotations at which load imposed on engine 36 is low. For example, an appropriate number of rotations may be set based on information on an operation of the work vehicle, such as characteristics and an operation time period of the work vehicle. In addition, the prescribed number of rotations may be set dynamically rather than fixedly. For example, change in accordance with an operation time period of the work vehicle or the like may be accepted.

When stop determination portion 55 makes determination as stop from the high idling state in response to the engine stop signal output from idling stop execution portion 57, it outputs the determination to that effect to counting portion 53.

Based on a result of determination from stop determination portion 55, counting portion 53 increments as a counter value, the number of times of stop of engine 36 from the high idling state (the number of times of stop of engine 36) as a result of the idling stop operation based on the engine stop signal.

A counter value of counting portion 53 is output to idling stop time period adjustment portion 54. In addition, a counter value of counting portion 53 is output to notification portion 58.

Idling stop time period adjustment portion 54 adjusts an idling stop time period which is a condition for performing an idling stop operation when a counter value counted by counting portion 53 (the number of times of stop of engine 36) is equal to or greater than the prescribed number of times. Specifically, when the counter value of counting portion 53 is equal to or greater than the prescribed number of times, idling stop time period adjustment portion 54 instructs idling stop time period setting portion 52 to adjust the idling stop time period to a time period longer than the currently set time period. Adjustment will be described later.

Notification portion 58 gives guidance information based on the counter value from counting portion 53 (the number of times of stop of engine 36). The "guidance information" is prescribed information which can be made use of by the operator, and it is, for example, information inviting the operator to take a prescribed action. By way of example, information urging check and maintenance of engine 36 of the work vehicle can be exemplified.

Notification condition storage portion 59 stores a counter value and guidance information to be given in accordance with the counter value, in correspondence with each other. Details of the guidance information will be described later.

Notification portion 58 reads guidance information corresponding to the counter value by referring to notification condition storage portion 59, and outputs the guidance information to monitor apparatus 21. Upon receiving the guidance information from notification portion 58, monitor apparatus 21 displays the guidance information on display portion 212. Display of the guidance information will be described later.

It is noted that engine 36, idling stop execution portion 57, stop determination portion 55, counting portion 53, idling stop time period adjustment portion 54, idling stop time period setting portion 52, notification portion 58, and fuel dial 39 are examples of the "engine", the "idling stop execution portion," the "determination portion", the "counting portion", the "idling stop time period adjustment portion," the "idling stop time period setting portion," the "notification portion", and the "adjustment dial" of the present invention, respectively.

Figure 7:
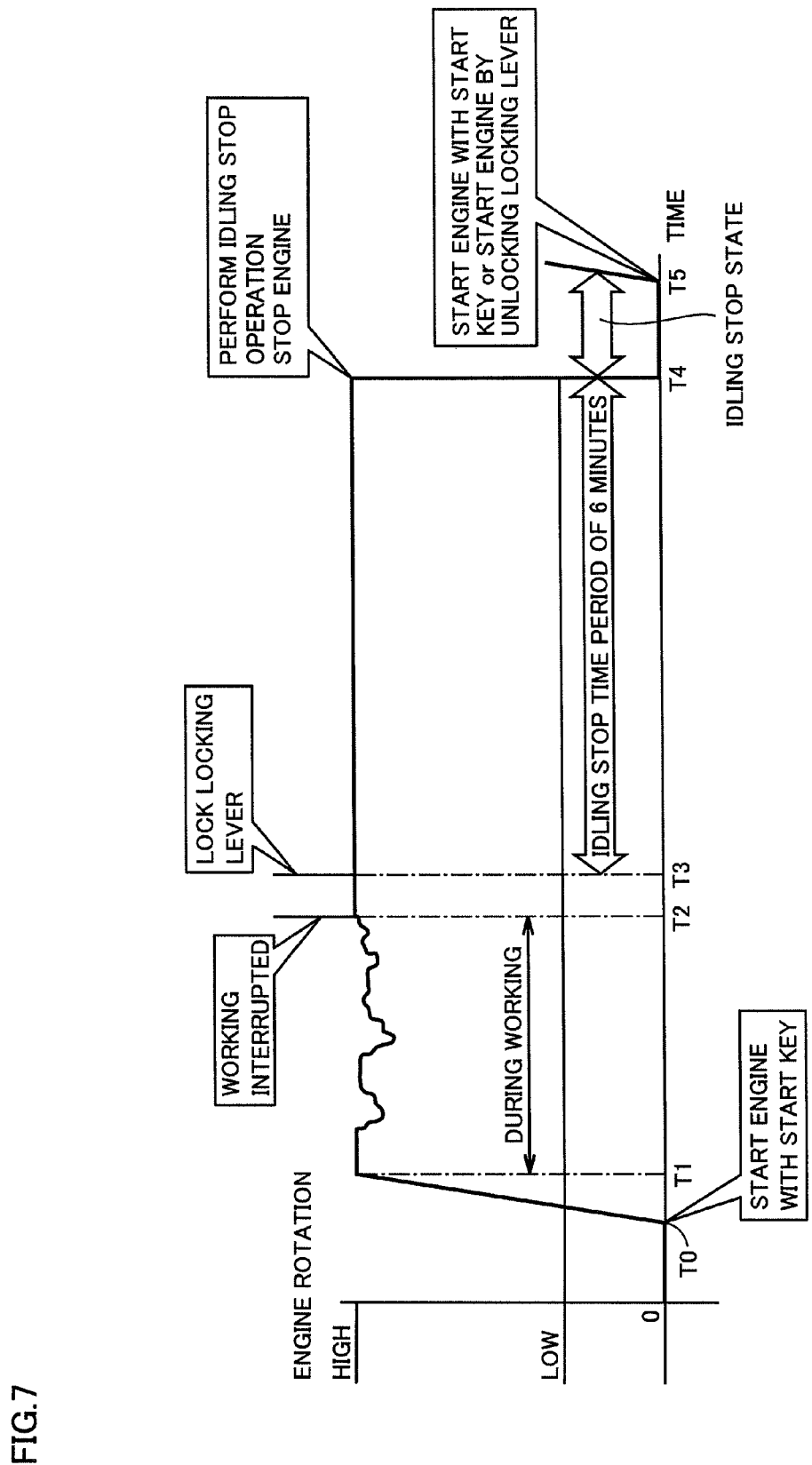
FIG. 7 is a diagram illustrating timing of an idling stop operation of work vehicle 101 based on the first embodiment.

FIG. 7 is a diagram illustrating timing of an idling stop operation of work vehicle 101 based on the first embodiment.

In FIG. 7, the ordinate represents the number of engine rotations and the abscissa represents time.

In the present example, by way of example, a case where engine 36 is started with a start key at time T0 is shown. Thereafter, a state where engine rotation is set to high rotation at time T1 is shown. Then, prescribed working is carried out by the work vehicle (during working). Prescribed working ends at time T2.

Then, the operator locks locking lever 20 at time T3. Accordingly, operation state detection portion 60 outputs a result of sensing to idling stop timer 56 in response to a sensing signal from PPC locking switch 42. Idling stop timer 56 counts time in accordance with the result of sensing. Namely, control of an idling stop operation is started.

Then, at time T4, when idling stop timer 56 indicates a prescribed time period (6 minutes in the present example) or longer, idling stop execution portion 57 outputs an engine stop signal to engine controller 38. Thus, engine 36 stops. Namely, engine controller 38 instructs governor motor 37 to lower the number of rotations of engine 36 to 0.

With such an operation, an idling stop state is established.

Then, engine 36 is started again with a start key 46 at time T5. Alternatively, engine 36 is started by unlocking the locking lever.

In the present example, though a case where an idling stop time period is set to 6 minutes, and when idling stop timer 56 counts 6 minutes, an engine stop signal is output from idling stop execution portion 57 to engine controller 38 has been described by way of example, an idling stop period can be set by the operator.

Figure 8:
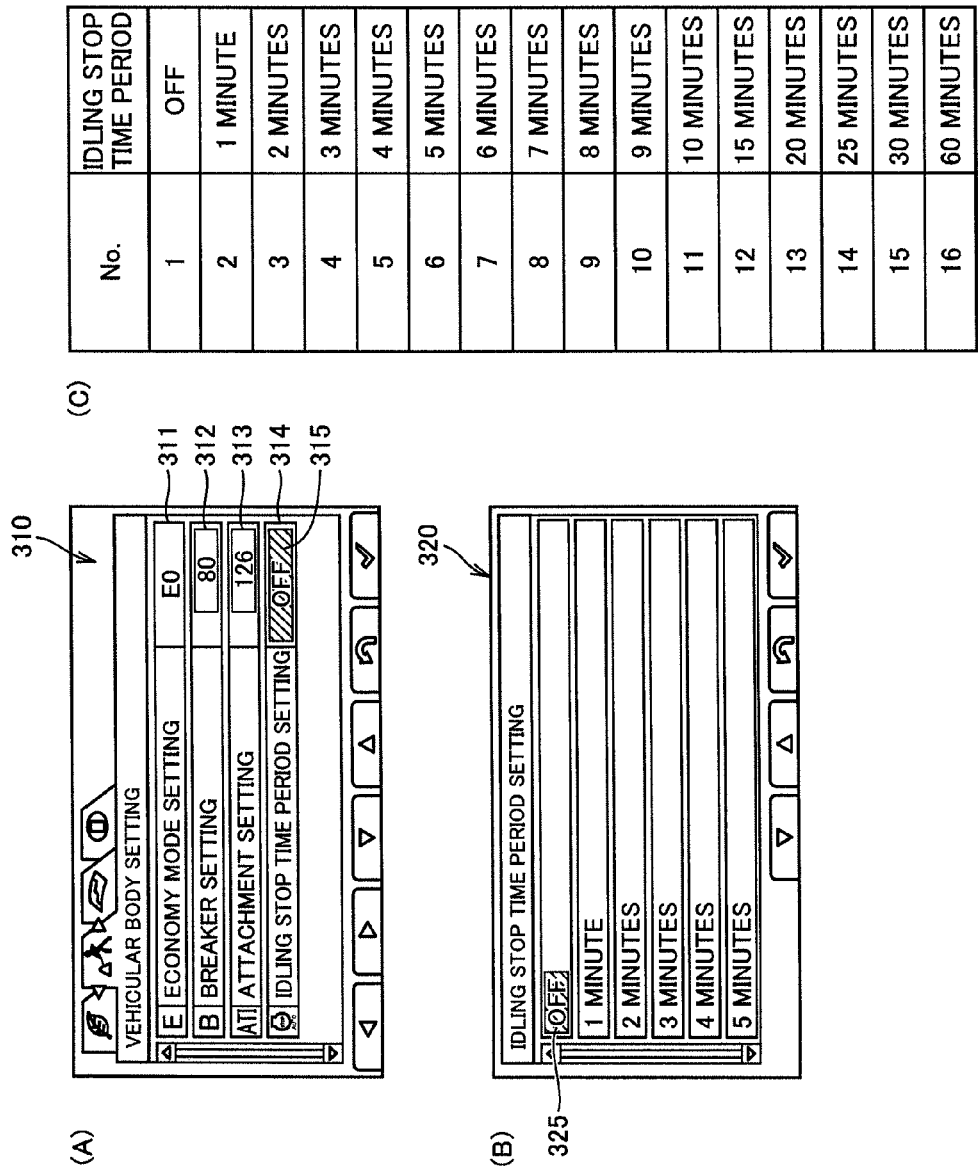
FIG. 8 is a diagram illustrating setting of an idling stop time period based on the first embodiment.

FIG. 8 is a diagram illustrating setting of an idling stop time period based on the first embodiment.

FIG. 8 (A) shows one example of a user mode picture. The user mode picture is displayed in a case where function switch F4 corresponding to guidance icon I3 displayed on display portion 212 is pressed in standard picture 301 described above. Then, a vehicular body setting picture 310 in which setting in connection with a vehicular body can be made among user mode pictures is displayed.

In vehicular body setting picture 310, here, items of "economy mode setting" 311 for setting details of the economy mode of the operation mode, "breaker setting" 312 for setting details of the breaker mode, "attachment setting" 313 for setting details of the attachment mode, and "idling stop time period setting" 314 for setting an idling stop time period which is a condition for performing an idling stop operation are shown.

The operator can make detailed setting of the item corresponding to a position of a cursor 315, by operating cursor 315 and making selection by selecting an instruction switch provided at a position in a lower portion of the picture.

In the present example, a case where cursor 315 is used to select an item regarding idling stop time period setting will be described. In the present example, a case where "OFF" is set as idling stop time period setting is shown by way of example.

As shown in FIG. 8 (B), here, an idling stop time period setting picture 320 is shown. When cursor 315 is moved over the item of "idling stop time period setting" 314 displayed on display portion 212 in vehicular body setting picture 310 described above and a function switch indicating selection is pressed, idling stop time period setting picture 320 is displayed.

In idling stop time period setting picture 320, a plurality of idling stop time periods are provided to allow setting. In the present example, a case where "OFF" and "1 minute" to "5 minutes" as a setting range from which selective setting can be made can be set is shown by way of example. It is noted that a time period longer than "5 minutes" can be set by further moving downward a cursor 325.

The operator operates cursor 325 and makes selection, so that a desired idling stop time period can be set. Namely, information on the set idling stop time period is input from monitor apparatus 21 to idling stop time period setting portion 52 and set in idling stop time period setting portion 52.

As shown in FIG. 8 (C), here, a setting table for setting an idling stop time period is shown.

Here, by way of example, a setting table in which 16 patterns of setting can be made is shown and a case where "60 minutes" can be set as a longest idling stop time period is shown.

Though a case where an idling stop time period is selected from among a plurality of items and then set has been described as an interface for setting an idling stop time period in the present example, limitation to such a scheme is not particularly intended. For example, such an interface that a time bar defining a longest length of an idling stop time period and a cursor movable to any position associated with the time bar are displayed and an idling stop time period is set in accordance with a position of the cursor with respect to the time bar may be adopted. Alternatively, in setting of an idling stop time period, a scheme may be such that any time period is set by an input of a numeric value by the operator.

<Main Control Processing>

Figure 9:
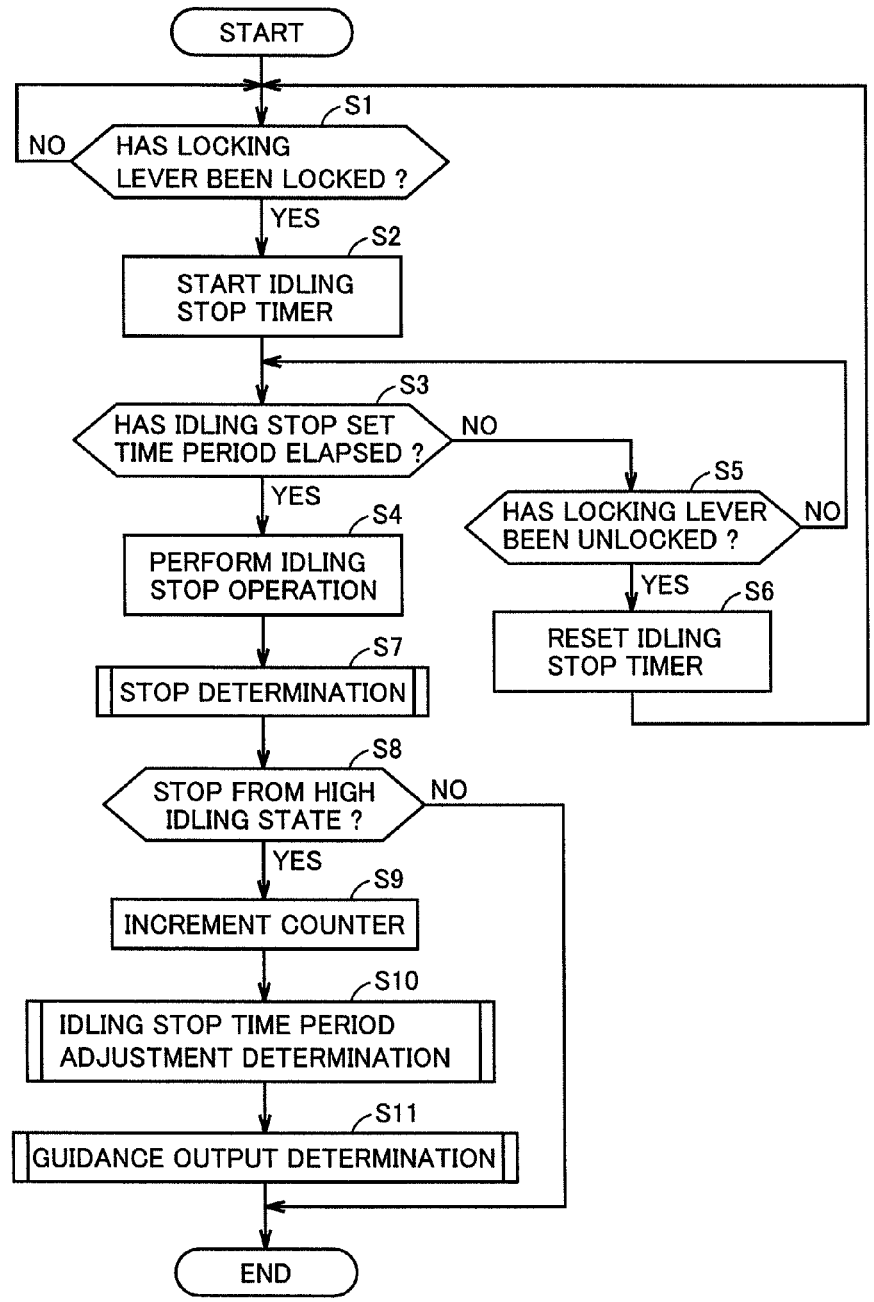
FIG. 9 is a diagram illustrating a main control flow of an idling stop control unit 51 based on the first embodiment.

FIG. 9 is a flowchart of main control processing by idling stop control unit 51 based on the first embodiment.

As shown in FIG. 9, initially, idling stop control unit 51 determines whether or not locking lever 20 has been locked (step S1). Specifically, operation state detection portion 60 detects locking of locking lever 20 and outputs that fact to idling stop timer 56. Then, idling stop timer 56 determines that locking lever 20 has been locked, based on a detection signal input from operation state detection portion 60.

Then, when it is determined in step S1 that locking lever 20 has been locked (YES in step S1), idling stop control unit 51 starts (activates) the idling stop timer (step S2). Specifically, idling stop timer 56 counts time based on input of the detection signal. Then, idling stop timer 56 outputs a counted timer value to idling stop execution portion 57.

Then, idling stop control unit 51 determines whether or not an idling stop set time period has elapsed (step S3). Specifically, idling stop execution portion 57 determines whether or not the timer value has exceeded the idling stop time period based on the idling stop time period set by idling stop time period setting portion 52 and a timer value input from idling stop timer 56.

When idling stop control unit 51 has determined in step S3 that the idling stop set time period has not elapsed (NO in step S3), it determines whether or not locking lever 20 has been unlocked (step S5). Specifically, operation state detection portion 60 detects unlocking of locking lever 20 and outputs that fact to idling stop timer 56. Then, idling stop timer 56 determines that locking lever 20 has been unlocked based on input of a detection signal from operation state detection portion 60.

Then, when idling stop control unit 51 has determined in step S5 that locking lever 20 has been unlocked (YES in step S5), it resets idling stop timer 56 (step S6). Specifically, idling stop timer 56 stops counting of time based on input of the detection signal and resets the counter value.

Then, the process returns to step S1 and idling stop control unit 51 again stands by until locking lever 20 is locked.

On the other hand, when idling stop control unit 51 has determined in step S5 that locking lever 20 has not been unlocked (NO in step S5), the process returns to step S3 and idling stop control unit 51 repeats the processing above until the idling stop set time period elapses.

When idling stop control unit 51 has determined in step S3 that the idling stop set time period has elapsed (YES in step S3), an idling stop operation is performed (step S4). Specifically, when idling stop execution portion 57 determines that the idling stop time period set by idling stop time period setting portion 52 has been exceeded in accordance with the timer value input from idling stop timer 56, it outputs an engine stop signal to engine controller 38. Thus, engine controller 38 instructs governor motor 37 to stop engine 36.

With such processing, when an idling state of work vehicle 101 has continued for a prescribed time period, engine 36 of the work vehicle can automatically be stopped and energy consumption and noise can be suppressed.

Then, idling stop control unit 51 performs stop determination processing (step S7). Specifically, stop determination portion 55 performs stop determination processing in response to input of the engine stop signal from idling stop execution portion 57. The "stop determination processing" is processing for determining whether or not stop has been made from the idling state in which the number of rotations of engine 36 in the idling state is high (the "high idling state") and details of the determination processing will be described later.

Then, idling stop control unit 51 determines whether or not a result of determination in the stop determination processing indicates stop from the high idling state (step S8).

When idling stop control unit 51 has determined in step S8 that a result of determination in the stop determination processing indicates stop from the high idling state (YES in step S8), the count value is incremented (step S9). Specifically, stop determination portion 55 outputs a count signal to counting portion 53. Accordingly, counting portion 53 increments the count value.

Then, idling stop control unit 51 performs processing for determination for adjustment of an idling stop time period (idling stop time period adjustment determination processing) (step S10). The "idling stop time period adjustment determination processing" is processing for determining whether or not to adjust an idling stop time period and for adjusting the idling stop time period based on a result of determination. Details of the processing will be described later.

Then, idling stop control unit 51 performs guidance output determination processing (step S11). The "guidance output determination processing" is processing for determining whether or not to output guidance and for outputting guidance based on a result of determination, and details of the processing will be described later.

Then, idling stop control unit 51 ends the process (end).

On the other hand, when idling stop control unit 51 determines in step S8 that a result of determination in the stop determination processing does not indicate stop from the high idling state (NO in step S8), the process ends (end).

<Stop Determination Processing>

Figure 10:
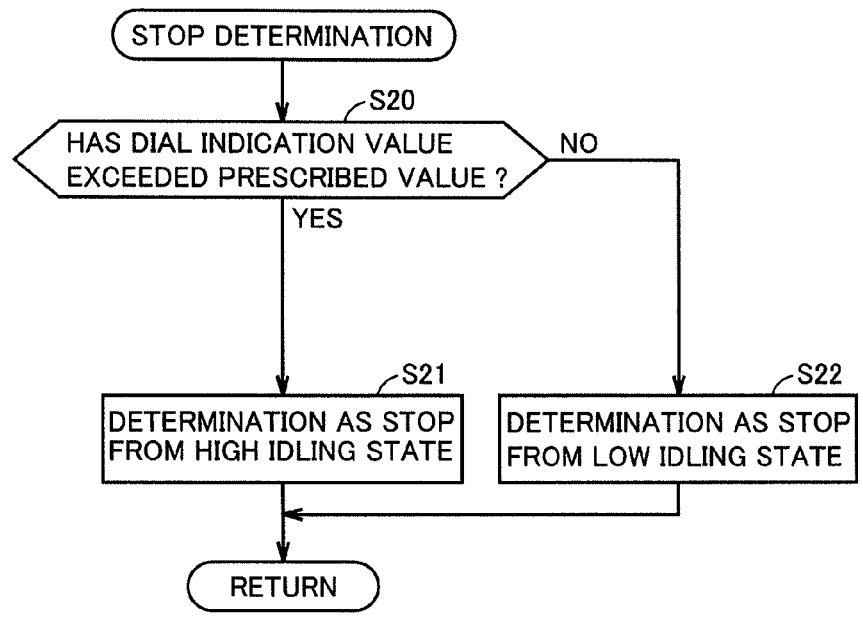
FIG. 10 is a flowchart illustrating details of stop determination processing based on the first embodiment.

FIG. 10 is a flowchart of the stop determination processing based on the first embodiment. The processing is processing mainly in stop determination portion 55. The stop determination processing is processing for determining whether or not stop has been made from the high idling state in which the number of rotations of engine 36 in the idling state is high. In the present example, stop determination portion 55 determines whether the high idling state in which load is imposed on engine 36 or the low idling state in which load imposed on engine 36 is low has been established, based on rotation information on the number of rotations of engine 36. Specifically, a dial indication value in accordance with such an amount of operation of fuel dial 39 that the number of rotations of engine 36 attains to a prescribed number of rotations (1000 rpm) is set as a prescribed value serving as a criterion on which determination as to whether or not engine 36 is in the high idling state is based, and whether the high idling state or the low idling state has been established is determined based on whether or not the prescribed value has been exceeded or not.

As shown in FIG. 10, stop determination portion 55 in the present example makes use of a dial indication value regarding the number of rotations of engine 36 as the rotation information on the number of rotations of engine 36, by way of example.

Stop determination portion 55 determines whether or not a dial indication value input through engine controller 38 has exceeded a prescribed value (step S20).

When stop determination portion 55 has determined in step S20 that the dial indication value has exceeded the prescribed value (YES in step S20), it makes determination as stop from the high idling state (step S21).

Then, the process ends (return).

On the other hand, when stop determination portion 55 has determined in step S20 that the dial indication value is equal to or lower than the prescribed value (NO in step S20), it makes determination as stop from the low idling state (step S22).

Then, the process ends (return).

When determination as stop from the high idling state is made in the stop determination processing, the count value of counting portion 53 is incremented.

Therefore, the number of times of stop of engine 36 in a case where the engine has been determined to stop from the high idling state can be counted, with a case where engine 36 has been determined to stop from the low idling state with the scheme based on the first embodiment being excluded. Namely, by counting the number of times of stop in such a situation that load imposed on engine 36 is high with the number of times of stop in such a situation that load imposed on engine 36 is low being excluded, a degree of load imposed on engine 36 can accurately be ascertained.

In addition, since it can be determined that engine 36 is stopped from the high idling state based on the dial indication value, it is not necessary to determine the number of rotations by providing a sensor, processing load can be mitigated, and determination can be made with a simplified scheme.

Though such a scheme that whether stop is made from the high idling state or from the low idling state is determined based on a dial indication value of fuel dial 39 regarding the number of rotations of engine 36 as rotation information on the number of rotations of engine 36 has been described in the present example, limitation to the scheme is not intended, and for example, an actually measured value of the number of rotations of engine 36 from rotation sensor 40 can also be used. Specifically, the number of rotations of engine 36 obtained as an actually measured value from rotation sensor 40 and a prescribed number of rotations (1000 rpm by way of example) are compared with each other, and based on a result thereof, whether stop has been made from the high idling state or from the low idling state can also be determined.

In addition, though a case where whether or not rotation of engine 36 is in the high idling state is determined based on a dial indication value of fuel dial 39 regarding the number of rotations of engine 36 as rotation information on the number of rotations of engine 36 has been described in the present example, whether or not the high idling state has been established can also be determined based on rotation information on the number of rotations of engine 36 other than the dial indication value. For example, in order to improve performance of the work vehicle in accordance with environmental factors (a cold region or the like), there is a case where a function to set the number of rotations in the idling state as a prescribed number of rotations is provided, regardless of a dial indication value of fuel dial 39. In a case where such a function is provided in main controller 50, in accordance with a rotation command value for the number of rotations of engine 36 based on the function for engine controller 38, whether or not the high idling state has been established can also be determined based on whether or not the rotation command value has exceeded a prescribed value for determining whether or not the high idling state has been established. Alternatively, information on an operation mode for controlling a range of the number of rotations of engine 36 can also be used as rotation information on the number of rotations of engine 36. Specifically, in a case of an operation mode in which operation at high rotation as a range of the number of rotations of engine 36 is assumed as an operation mode, whether or not the high idling state has been established can also be determined based on the information on the operation mode.

<Idling Stop Time Period Adjustment Determination Processing>

Figure 11:
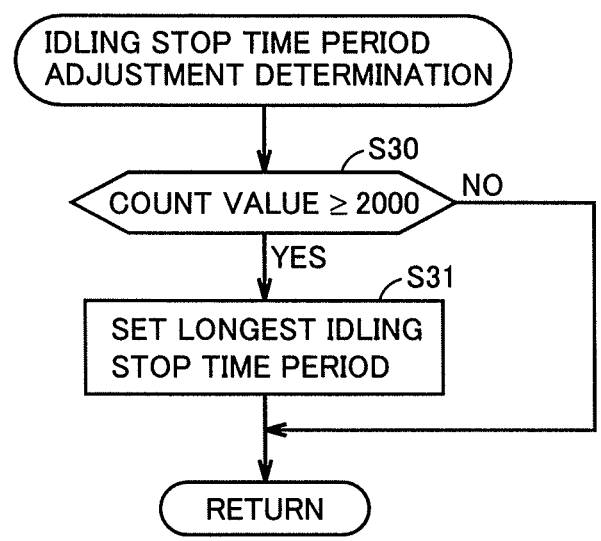
FIG. 11 is a flowchart illustrating details of idling stop time period adjustment determination based on the first embodiment.

FIG. 11 is a flowchart illustrating idling stop time period adjustment determination processing based on the first embodiment. The processing is processing mainly in idling stop time period adjustment portion 54 of idling stop control unit 51.

As shown in FIG. 11, idling stop time period adjustment portion 54 determines whether or not a count value from counting portion 53 is equal to or greater than a prescribed number of times (in the present example, equal to or greater than 2000 by way of example) (step S30).

When idling, stop time period adjustment portion 54 has determined in step S30 that the count value is equal to or greater than the prescribed number of times (YES in step S30), then it sets a longest idling stop time period (step S31). Specifically, idling stop time period adjustment portion 54 instructs idling stop time period setting portion 52 to set the longest idling stop time period. By way of example of setting of the idling stop time period described with reference to FIG. 8, 60 minutes which is the longest time period can be set. Thus, the number of times of stop that engine 36 stops by the idling stop operation can effectively be suppressed. It is noted that, if the longest idling stop time period has already been set, the longest time period is maintained.

On the other hand, when idling stop time period adjustment portion 54 has determined in step S30 that the count value is not equal to or greater than the prescribed number of times (NO in step S30), step S31 is skipped and the process ends (return).

In the present example, a case where the longest idling stop time period is set when the count value of counting portion 53 is equal to or greater than the prescribed number of times, that is, when the number of times of stop of engine 36 in the high idling state is equal to or greater than the prescribed number of times, has been described by way of example. With such processing, the number of times of the idling stop operation performed (the number of times of stop of engine 36) can be suppressed, load imposed on engine 36 can be mitigated, and durability of engine 36 can be improved.

Though a case where the longest idling stop time period is set has been described in the present example, limitation to the longest time period is not particularly intended. By setting the idling stop time period to be longer than the currently set idling stop time period, the number of times of the idling stop operation performed (the number of times of stop of engine 36) can be suppressed, load imposed on engine 36 can be mitigated, and durability of engine 36 can be improved. Specifically, such setting that the currently set idling stop time period is extended by a prescribed period (+a) should only be made. In such a case, even though the longest idling stop time period (60 minutes) has already been set, a time period further extended by a prescribed period (+a) may be set.

Though 2000 has been described by way of example of the prescribed number of times serving as a threshold value for adjustment of the idling stop time period in the present example, limitation to that numeric value is not particularly intended. A person skilled in the art could make adjustment as appropriate to an appropriate numeric value for improving durability of engine 36. For example, an appropriate number of times may be set based on information on an operation of the work vehicle, such as characteristics and an operation time period of the work vehicle. In addition, the prescribed number of times serving as the threshold value may be set dynamically rather than fixedly. Variation in accordance with an operation time period of the work vehicle or the like may be allowed.

In addition, though a case where a longest idling stop time period is set when a count value is equal to or greater than a prescribed number of times serving as a threshold value has been described in the present example, the idling stop time period can be varied stepwise to the longest time period. For example, it is also possible that a plurality of threshold values are provided and an idling stop time period is brought closer stepwise to the longest time period each time the count value is equal to or greater than the threshold value.

Moreover, though a case where the same time period is set for the idling stop time period in the high idling state of engine 36 and for the idling stop time period in the low idling state has been described in the present example, limitation as such is not particularly intended, and an independent idling stop time period may be set. In such a case, when a count value is equal to or greater than the prescribed number of times serving as a threshold value, by setting a length of the idling stop time period in the high idling state to be longer than the currently set time period, the number of times of the idling stop operation performed (the number of times of stop of engine 36) can be suppressed, load imposed on engine 36 can be mitigated, and durability of engine 36 can be improved.

<Guidance Output Determination Processing>

Figure 12:
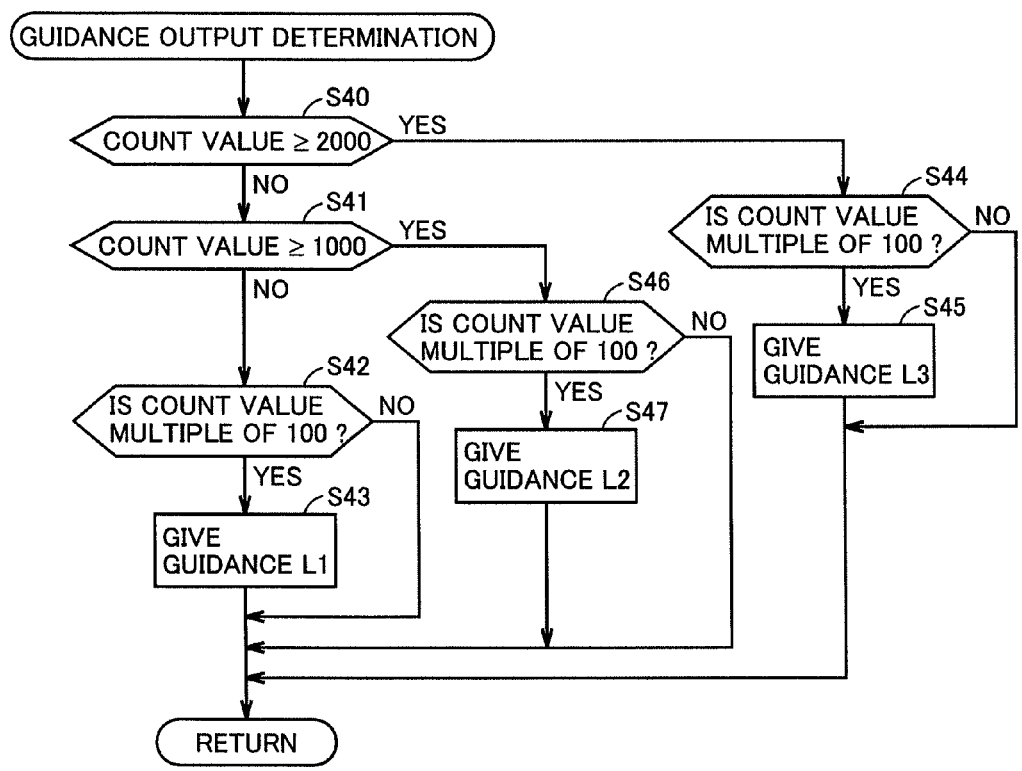
FIG. 12 is a flowchart illustrating details of guidance output determination processing based on the first embodiment.

FIG. 12 is a flowchart of guidance output determination processing based on the first embodiment. The processing is processing mainly in notification portion 58.

As shown in FIG. 12, notification portion 58 determines whether or not a count value from counting portion 53 is equal to or greater than 2000 (step S40).

When notification portion 58 has determined in step S40 that the count value is equal to or greater than 2000 (YES in step S40), the process proceeds to step S44 and notification portion 58 determines whether or not the count value is a multiple of 100 (step S44).

When notification portion 58 has determined in step S44 that the count value is a multiple of 100 (YES in step S44), guidance L3 is given (step S45). Then, the process ends (return).

When notification portion 58 has determined in step S44 that the count value is not a multiple of 100 (NO in step S44), step S45 is skipped and the process ends (return).

When notification portion 58 has determined in step S40 that the count value is not equal to or greater than 2000 (NO in step S40), the process proceeds to step S41 and notification portion 58 determines whether or not the count value is equal to or greater than 1000 (step S41).

When notification portion 58 has determined in step S41 that the count value is equal to or greater than 1000 (YES in step S41), the process proceeds to step S46 and notification portion 58 determines whether or not the count value is a multiple of 100 (step S46).

When notification portion 58 has determined in step S46 that the count value is a multiple of 100 (YES in step S46), guidance L2 is given (step S47). Then, the process ends (return).

When notification portion 58 has determined in step S46 that the count value is not a multiple of 100 (NO in step S46), step S47 is skipped and the process ends (return).

When notification portion 58 has determined in step S41 that the count value is not equal to or greater than 1000 (NO in step S41), the process proceeds to step S42 and notification portion 58 determines whether or not the count value is a multiple of 100 (step S42).

When notification portion 58 has determined in step S42 that the count value is a multiple of 100 (YES in step S42), guidance L1 is given (step S43). Then, the process ends (return).

When notification portion 58 has determined in step S42 that the count value is not a multiple of 100 (NO in step S42), step S43 is skipped and the process ends (return).

In such processing, when the count value is smaller than 1000, notification portion 58 gives guidance L1 each time a multiple of 100 is attained. Therefore, notification portion 58 gives guidance L1 9 times by the time when the count value attains to 1000. Similarly, when the count value is not smaller than 1000 and smaller than 2000, notification portion 58 gives guidance L2 each time a multiple of 100 is attained. Therefore, notification portion 58 gives guidance L2 10 times by the time when the count value attains to 2000. Then, even after the count value attains to 2000, notification portion 58 gives guidance L3 each time a multiple of 100 is attained.

FIG. 13 is a diagram illustrating guidance information based on the first embodiment.

As shown in FIG. 13, the guidance information is stored in notification condition storage portion 59.

In the present example, message contents given in correspondence with guidance L1 to L3 are allocated. Specifically, guidance L1 is "The number of times of stop from high idling state has attained to X. After working ends, please carry out engine check and maintenance as necessary." Guidance L2 is "The number of times of stop from high idling state has attained to X. After working ends, please carry out engine check and maintenance." Guidance L3 is "The number of times of stop from high idling state has attained to X. Please stop working and immediately carry out engine check and maintenance." Namely, a degree of urging check and maintenance of engine 36 is increased stepwise. It is noted that "X" can be changed in accordance with a figure of the count value from counting portion 53.

With the processing, the operator can be notified of a degree of load imposed on engine 36. In addition, with increase in the number of times of stop of the engine which is the count value, that is, in accordance with a degree of load imposed on engine 36, contents of guidance information can be changed for notification to the operator.

In addition, though a case where guidance is given to the operator each time a multiple of 100 is attained such that notification is comfortable and necessary for the operator has been described in the present example, limitation to such a scheme is not particularly intended, and the number of times of calling for attention can also be increased by giving notification each time. Moreover, the number of times of notification can also be increased stepwise.

FIG. 14 is a diagram illustrating an example of display on monitor apparatus 21 in accordance with the guidance information based on the first embodiment.

As shown in FIG. 14, here, a display screen displayed on monitor apparatus 21 during a normal idling stop operation is shown.

As shown in FIG. 14 (A), a pop-up screen is displayed, and together with words "during idling stop," display of "please turn off key in order to prevent battery from running off" is given to the operator.

As shown in FIG. 14 (B), here, a pop-up screen is displayed, and together with words "during idling stop," display of "The number of times of stop from high idling state has attained to X. After working ends, please carry out engine check and maintenance as necessary." is given to the operator.

With such display, guidance information on check and maintenance of engine 36 can be given to the operator in an appropriate form, in accordance with a degree of load imposed on engine 36. Though a case where guidance information is given through display has been described in the present example by way of example, limitation to display is not particularly intended, and notification to the operator can be given also through voice and sound, vibration, or the like. In addition, voice and sound and/or vibration etc. can also be varied in accordance with a degree of load imposed on engine 36.

In idling control according to the first embodiment, the number of times of stop of engine 36 from the high idling state is counted and the longest idling stop time period is set when the number of times of stop is equal to or greater than a prescribed number of times. With such processing, the number of times of stop of engine 36 from the high idling state which is a situation that load is imposed is counted with the number of times of stop of engine 36 in such a situation that load imposed on engine 36 is low being excluded, so that a degree of load imposed on engine 36 can accurately be ascertained. Then, by setting the idling stop period to be longer when the number of times of stop of engine 36 is equal to or greater than the prescribed number of times, the number of times of the idling stop operation performed (the number of times of stop of engine 36) can be suppressed, load imposed on engine 36 can be mitigated, and durability of engine 36 can be improved.

Second Embodiment

In the first embodiment above, such a scheme that the number of times of stop of engine 36 by an idling stop operation in the high idling state in which the number of rotations of engine 36 is high is counted based on rotation information on the number of rotations of engine 36 and an idling stop time period is adjusted based on a result of counting has been described.

On the other hand, the work vehicle is provided with a deceleration function for performing a deceleration operation for setting rotation of engine 36 to an idling state low in the number of rotations while load is low such as when working or traveling not carried out and for immediately returning rotation of engine 36 to an originally set number of rotations at the time of start of working or traveling. Then, by making use of the deceleration function, useless fuel consumption or noise can be suppressed.

In this regard, the deceleration function is provided such that it can be set to active or inactive in accordance with an operator's intention, and when the deceleration function is set to active, the deceleration operation sets an idling state in which the number of rotations of engine 36 is low from the current idling state and thereafter engine 36 is stopped by an idling stop operation. Thus, load imposed on engine 36 can be mitigated.

On the other hand, when the deceleration function is set to inactive, engine 36 is stopped by an idling stop operation without an idling state low in the number of rotations of engine 36 being set by the deceleration operation from the current idling state, and hence load can be imposed on engine 36.

Therefore, in the second embodiment, a case where, when the deceleration function is set to inactive, the number of times of stop that engine 36 is stopped by the idling stop operation is counted so that load imposed on engine 36 is accurately ascertained, and an idling stop time period is adjusted based on a result of counting will be described.

<Idling Stop Function>

Figure 15:
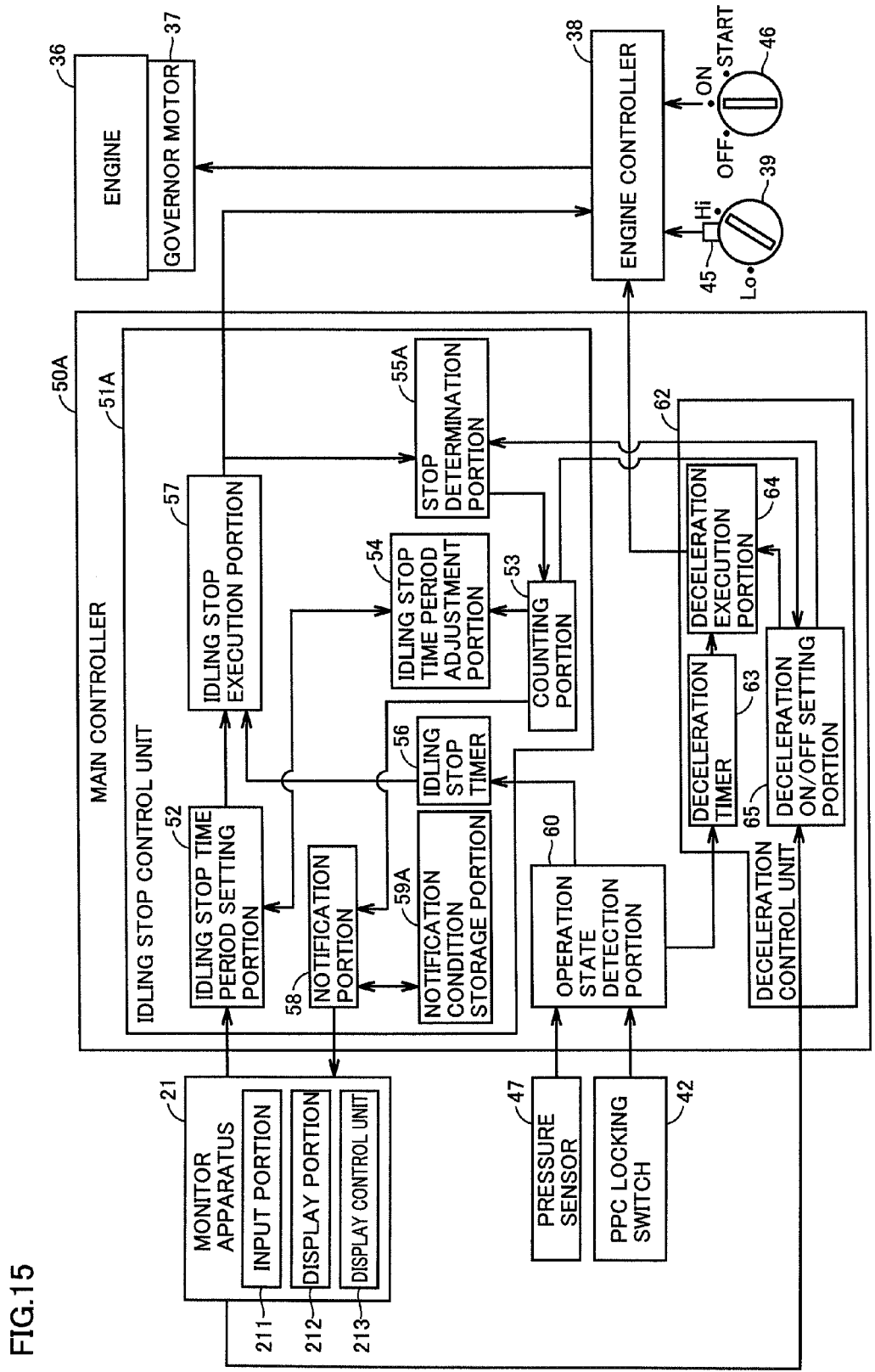
FIG. 15 is a functional block diagram illustrating an idling function of a main controller 50A in a control system of work vehicle 101 based on a second embodiment.

FIG. 15 is a functional block diagram illustrating an idling function of a main controller 50A in a control system of work vehicle 101 based on the second embodiment.

As shown in FIG. 15, main controller 50A is different from main controller 50 described in the first embodiment above in that idling stop control unit 51 is replaced with an idling stop control unit 51A and a deceleration control unit 62 is further added. In addition, a case where a pressure sensor 47 is provided as a peripheral device and pressure sensor 47 is connected to operation state detection portion 60 is shown.

Deceleration control unit 62 includes a deceleration timer 63, a deceleration execution portion 64, and a deceleration ON/OFF setting portion 65.

Deceleration ON/OFF setting portion 65 sets active/inactive (ON/OFF) of the deceleration function in response to an instruction from deceleration switch 111 (FIG. 4) of monitor apparatus 21. ON of the deceleration function means setting of the deceleration function to active. OFF of the deceleration function means setting of the deceleration function to inactive.

Deceleration execution portion 64 outputs a deceleration instruction signal for performing a deceleration operation to engine controller 38 when a prescribed condition is satisfied. The "deceleration operation" means an operation for causing the engine of the work vehicle to stand by in an idling state in which the number of rotations is low. This prescribed condition is a condition for performing a "deceleration operation" and it is a condition relating to a time period since stop of working of the work vehicle mainly when the deceleration function is active, that is, a condition of a time period relating to continuation of a non-working state. In the present example, the "time period" is also referred to as a deceleration time period.

Deceleration timer 63 is a timer which starts counting of time in response to an instruction from operation state detection portion 60. Then, deceleration timer 63 outputs a result of counting to deceleration execution portion 64. Here, an instruction from operation state detection portion 60 is a sensing signal (a result of sensing) indicating that work implement lever 18, 19 is in a neutral state.

Engine controller 38 instructs governor motor 37 to set the number of rotations of engine 36 to the prescribed number of rotations in response to a deceleration instruction signal, controls an amount of fuel injected by a fuel injection apparatus or the like, and adjusts the number of rotations of engine 36. The "prescribed number of rotations" is the number of rotations set in advance such that a "low idling state" in which the number of rotations of engine 36 is low is established. In the present example, the number of rotations in the low idling state in which the number of rotations is low is set to 1000 rpm by way of example. With the deceleration operation, useless fuel consumption and noise can be suppressed.

Stop determination portion 55A in the second embodiment determines whether or not engine 36 stops from the high idling state, in response to an engine stop signal output from idling stop execution portion 57. Here, stop from the "high idling state" means that engine 36 stops from the number of rotations higher than the prescribed number of rotations. Specifically, stop determination portion 55A determines whether or not engine 36 stops in response to the engine stop signal, based on information on whether the deceleration function is active/inactive.

When stop determination portion 55A has determined that engine 36 has stopped from the high idling state, it outputs the determination to that effect to counting portion 53.

Based on a result of determination from stop determination portion 55A, counting portion 53 increments as a counter value, the number of times of stop of engine 36 (the number of times of stop of engine 36) by the idling stop operation based on the engine stop signal.

A counter value of counting portion 53 is output to idling stop time period adjustment portion 54. In addition, a counter value of counting portion 53 is output to notification portion 58.

Idling stop time period adjustment portion 54 adjusts an idling stop time period which is a condition for performing the idling stop operation when the counter value (the number of times of stop of engine 36) counted by counting portion 53 is equal to or greater than the prescribed number of times. Specifically, when the counter value of counting portion 53 is equal to or greater than the prescribed number of times, idling stop time period adjustment portion 54 instructs idling stop time period setting portion 52 to adjust the idling stop time period to a long time period.

Notification portion 58 gives guidance information based on the counter value from counting portion 53 (the number of times of stop of engine 36). The "guidance information" is prescribed information which can be made use of by the operator, and it is, for example, information inviting the operator to take a prescribed action. By way of example, information urging check and maintenance of the work vehicle can be exemplified.

Notification condition storage portion 59A stores a counter value and guidance information to be given in accordance with the counter value, in correspondence with each other.

Notification portion 58 reads guidance information corresponding to the counter value by referring to notification condition storage portion 59A, and outputs the guidance information to monitor apparatus 21. Upon receiving the guidance information from notification portion 58, monitor apparatus 21 displays the guidance information on display portion 212.

It is noted that deceleration execution portion 64 and deceleration ON/OFF setting portion 65 are examples of the "deceleration execution portion" and the "deceleration setting portion" in the present invention, respectively.

Figure 16:
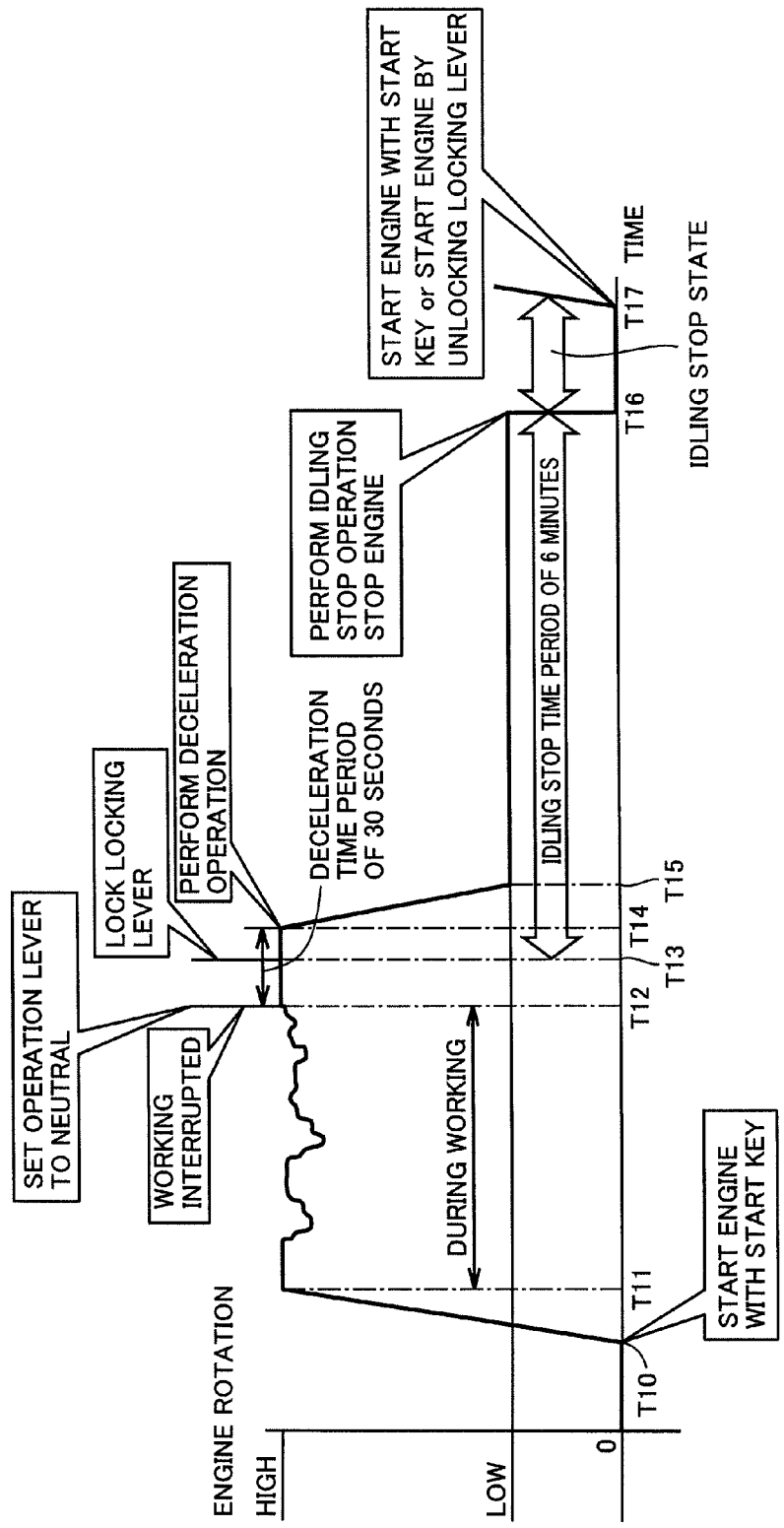
FIG. 16 is a diagram illustrating timing of an idling stop operation of work vehicle 101 based on the second embodiment.

FIG. 16 is a diagram illustrating timing of an idling stop operation of work vehicle 101 based on the second embodiment.

As shown in FIG. 16, here, by way of example, the ordinate represents the number of engine rotations and the abscissa represents time.

In the present example, by way of example, a case where engine 36 is started with a start key at time T10 is shown. Thereafter, a state where engine rotation is set to high rotation at time T11 is shown. Then, prescribed working is carried out in the work vehicle (during working). At time T12, prescribed working is interrupted and the operation lever is set to neutral. Accordingly, operation state detection portion 60 senses that the operation lever has been set to neutral (a non-working state). Then, a result of sensing is output to deceleration timer 63. Deceleration timer 63 counts time in accordance with the result of sensing. Namely, control of the deceleration operation is started.

In addition, the operator locks locking lever 20 at time T13. Accordingly, operation state detection portion 60 outputs a sensing signal to idling stop timer 56 in response to a sensing signal from PPC locking switch 42. Idling stop timer 56 counts time in accordance with the sensing signal. Namely, control of an idling stop operation is started.

In addition, when a prescribed time period (30 seconds in the present example) is exceeded in deceleration timer 63 at time T15, deceleration execution portion 64 outputs a deceleration instruction signal to engine controller 38. Thus, engine controller 38 controls governor motor 37 in response to the deceleration instruction signal and sets the number of rotations of engine 36 to the low idling state.

Then, at time T16, when a prescribed time period (6 minutes in the present example) is exceeded in idling stop timer 56, idling stop execution portion 57 outputs an engine stop signal to engine controller 38. Thus, engine 36 stops. Namely, engine controller 38 instructs governor motor 37 to lower the number of rotations of engine 36 to 0. With such an operation, an idling stop state is established.

Then, engine 36 is started again with the start key at time T17. Alternatively, engine 36 is started by unlocking the locking lever.

Therefore, by performing the deceleration operation before the idling stop operation, engine 36 can be stopped from the low idling state.

Figure 17:
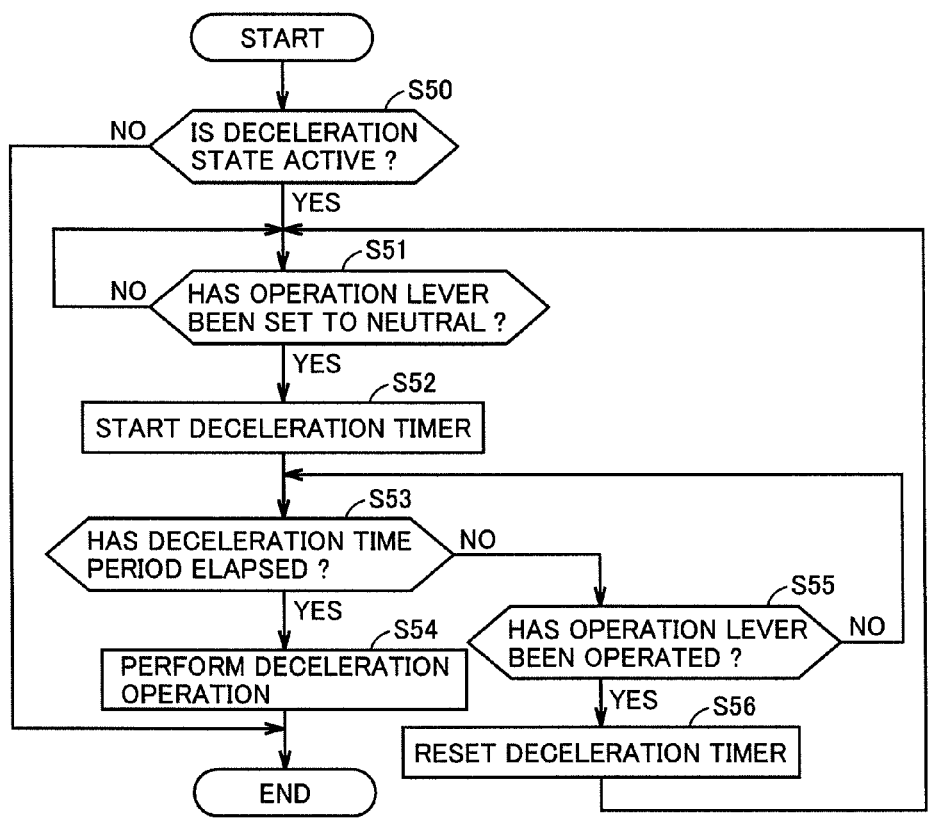
FIG. 17 is a diagram illustrating a control flow by a deceleration control unit 62 based on the second embodiment.

FIG. 17 is a flowchart of deceleration control processing by deceleration control unit 62 based on the second embodiment.

As shown in FIG. 17, deceleration control unit 62 determines whether or not the deceleration function is active (step S50). Specifically, deceleration ON/OFF setting portion 65 determines whether or not the deceleration function is active (ON) in response to deceleration switch 111.

When deceleration control unit 62 has determined in step S50 that the deceleration function is active (YES in step S50), it determines whether or not the operation lever is neutral (step S51). Specifically, operation state detection portion 60 detects whether or not the operation lever is neutral and outputs the result to deceleration timer 63. Then, deceleration timer 63 determines that the operation lever is neutral based on input of a detection signal from operation state detection portion 60.

Then, when deceleration control unit 62 has determined in step S51 that the operation lever is neutral (YES in step S51), it starts deceleration timer 63 (step S52). Specifically, deceleration timer 63 counts time based on input of the detection signal. Then, deceleration timer 63 outputs the counted timer value to deceleration execution portion 64.

Then, deceleration control unit 62 determines whether or not a deceleration time period has elapsed (step S53). Specifically, deceleration execution portion 64 determines whether or not the counter value has exceeded the deceleration time period based on a deceleration time period set in advance (for example, 30 seconds by way of example) and a counter value input from deceleration timer 63.

When deceleration control unit 62 has determined in step S53 that the deceleration time period has not elapsed (NO in step S53), it determines whether or not an operation of the operation lever has been sensed (step S55). Specifically, operation state detection portion 60 detects an operation of the operation lever and outputs the result to deceleration timer 63. Then, deceleration timer 63 determines that the operation lever has been operated based on input of a detection signal from operation state detection portion 60.

When deceleration control unit 62 has determined in step S55 that the operation lever has been operated (YES in step S55), it resets deceleration timer 63 (step S56). Specifically, deceleration timer 63 stops counting of time based on input of a detection signal and resets the counter value.

Then, the process returns to step S51 and deceleration control unit 62 again stands by until the operation lever is set to neutral.

On the other hand, when deceleration control unit 62 has determined in step S55 that the operation lever has not been operated (NO in step S55), the process returns to step S53 and deceleration control unit 62 repeats the processing above until the deceleration time period elapses.

When deceleration control unit 62 has determined in step S53 that the deceleration time period has elapsed (YES in step S53), the deceleration operation is performed (step S54). Specifically, when deceleration execution portion 64 has determined that the deceleration time period has been exceeded in accordance with the counter value input from deceleration timer 63, it outputs a deceleration instruction signal to engine controller 38. Thus, engine controller 38 instructs governor motor 37 to lower the number of rotations of engine 36 and set the low idling state.

With the processing, when load is low in a non-operating state in which the work vehicle does not carry out working and/or traveling, rotation of engine 36 is set to the low idling state in which the number of rotations is low. Then, when the idling state has continued for a prescribed time period, additionally, engine 36 of the work vehicle is stopped. Thus, fuel consumption and noise of engine 36 can be suppressed.

Though a case where the deceleration time period is set to 30 seconds by way of example has been described in the present example, limitation to that time period is not particularly intended, and a person skilled in the art could make adjustment as appropriate to an appropriate numeric value for suppressing fuel consumption and noise of engine 36. It is noted that adjustment can also be made based on designation by an operator, by providing a setting portion for setting a deceleration time period, similarly to an idling stop time period. It is noted that relation between a deceleration time period and an idling stop time period can be such that the deceleration time period is shorter than the idling stop time period. Thus, the deceleration operation can be performed before the idling stop operation, engine 36 can be stopped from the low idling state, and energy consumption or noise can be suppressed.

Figure 18:
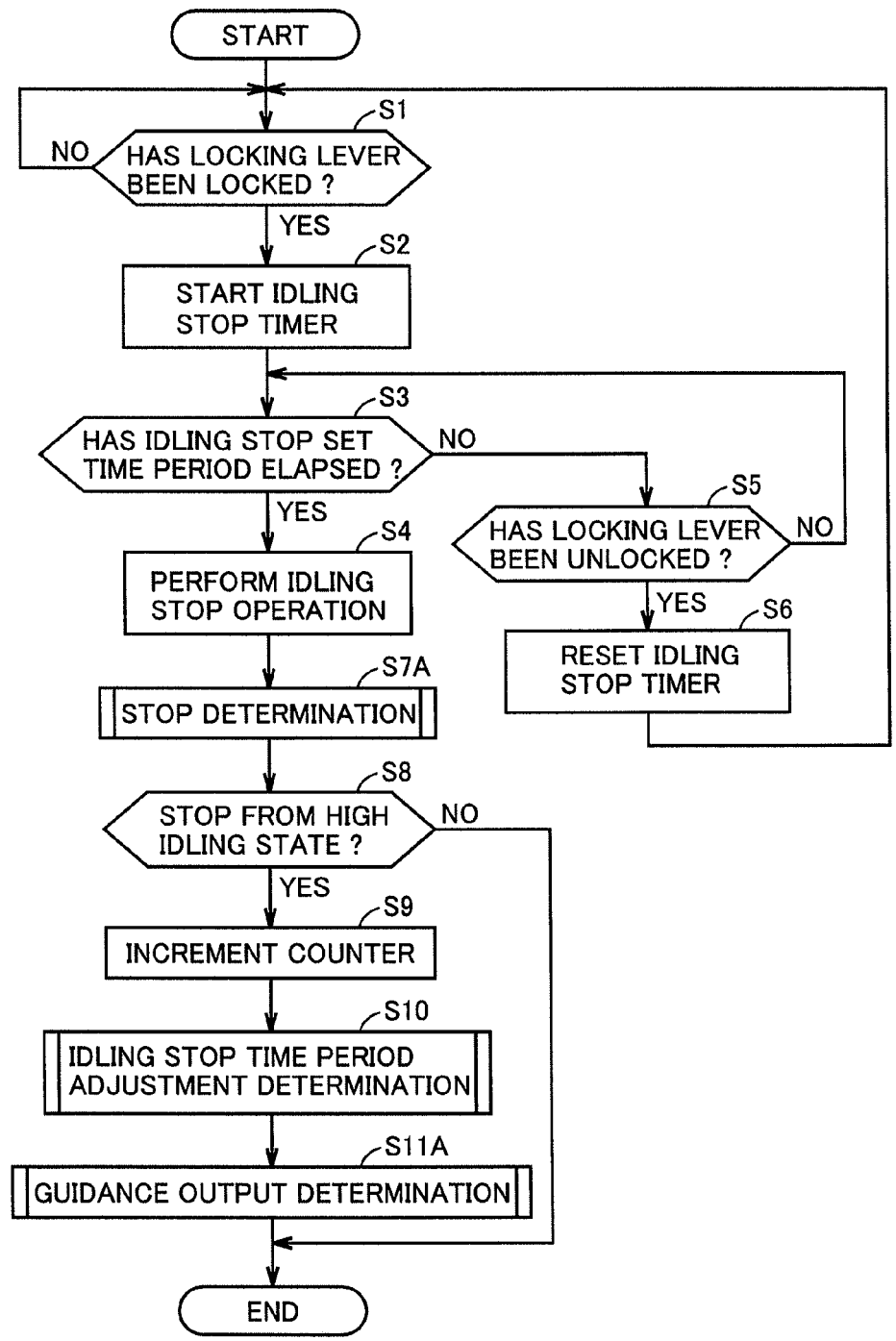
FIG. 18 is a diagram illustrating a main control flow of an idling stop control unit 51A based on the second embodiment.

FIG. 18 is a flowchart of main control processing by idling stop control unit 51A based on the second embodiment.

As shown in FIG. 18, as compared with the flowchart of the main control processing in FIG. 9, difference resides in replacement with stop determination processing in step S7A and guidance output determination processing in step S11A. Since a flow of processing is otherwise the same as in the flowchart described with reference to FIG. 9, detailed description thereof will not be repeated.

When an idling stop operation is performed in step S4, idling stop control unit 51A then performs stop determination processing (step S7A). The "stop determination processing" is processing for determining whether or not engine 36 has stopped and details of the processing for making determination will be described later.

Then, stop determination portion 55A determines whether or not a result of determination in the stop determination processing indicates stop from the high idling state (step S8).

When idling stop control unit 51A has determined in step S8 that a result of determination in the stop determination processing indicates stop from the high idling state (YES in step S8), the count value is incremented (step S9). Specifically, stop determination portion 55A outputs a count signal to counting portion 53. Accordingly, counting portion 53 increments the count value.

Then, idling stop control unit 51A performs determination processing for adjustment of an idling stop time period (idling stop time period adjustment determination processing) (step S10). The "idling stop time period adjustment determination processing" is processing for determining whether or not to adjust an idling stop time period and for adjusting an idling stop time period based on a result of determination. Since the processing is the same as described with reference to FIG. 11, details thereof will not be repeated.

Then, idling stop control unit 51A performs guidance output determination processing (step S11A). The "guidance output determination processing" is processing for determining whether or not to output guidance and for outputting guidance based on a result of determination, and details of the processing will be described later.

Then, idling stop control unit 51A ends the process (end).

On the other hand, when idling stop control unit 51A determines in step S8 that a result of determination in the stop determination processing does not indicate stop from the high idling state (NO in step S8), the process ends (end).

<Stop Determination Processing>

Figure 19:
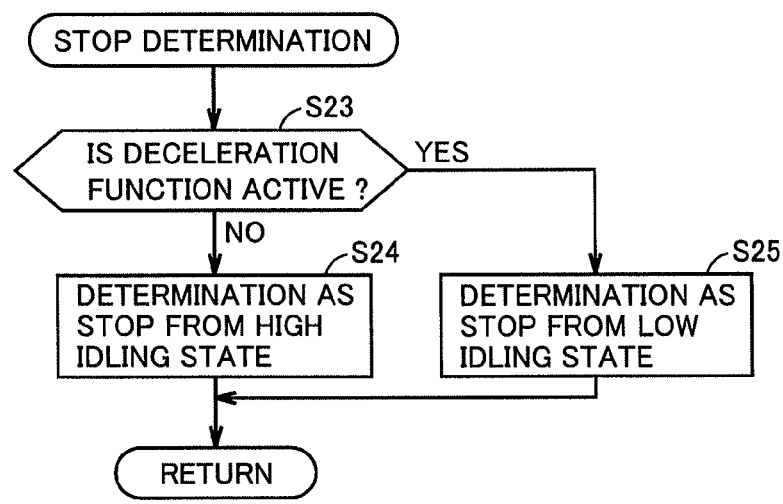
FIG. 19 is a flowchart illustrating details of stop determination processing based on the second embodiment.

FIG. 19 is a flowchart of the stop determination processing based on the second embodiment. The processing is processing mainly in stop determination portion 55A. The stop determination processing is processing for determining whether or not stop has been made from the high idling state in which the number of rotations of engine 36 in the idling state is high. In the present example, stop determination portion 55A determines whether stop has been made from the high idling state or from the low idling state, based on information on the deceleration function being active/inactive.

As shown in FIG. 19, stop determination portion 55A in the present example makes use of information on the deceleration function being active/inactive by way of example.

Stop determination portion 55A determines whether the deceleration function is active or inactive (step S23). Specifically, stop determination portion 55A determines whether the deceleration function is active or inactive in accordance with an instruction from deceleration ON/OFF setting portion 65. By way of example, when deceleration switch 111 is ON, determination as the deceleration function being active is made. On the other hand, when deceleration switch 111 is OFF, determination as the deceleration function being inactive is made.

When stop determination portion 55A has determined in step S23 that the deceleration function is active (YES in step S23), determination as stop from the low idling state is made (step S25). This is because the deceleration function is active and hence engine 36 stops from the low idling state.

Then, the process ends (return).

On the other hand, when stop determination portion 55A has determined in step S23 that the deceleration function is inactive (NO in step S23), determination as stop from the high idling state is made (step S24). This is because the deceleration function is inactive and hence engine 36 may stop from the high idling state.

Then, the process ends (return).

When determination as stop from the high idling state has been made in the stop determination processing, the count value of counting portion 53 is incremented.

Therefore, the number of times of stop of engine 36 in a case where determination as stop from the high idling state is made can be counted, with a case where engine 36 is determined to stop from the low idling state with the scheme based on the second embodiment being excluded. Namely, by counting the number of times of stop in such a situation that load is imposed on engine 36 with the number of times of stop in such a situation that load imposed on engine 36 is low being excluded, a degree of load imposed on engine 36 can accurately be ascertained.

<Guidance Output Determination Processing>

Figure 20:
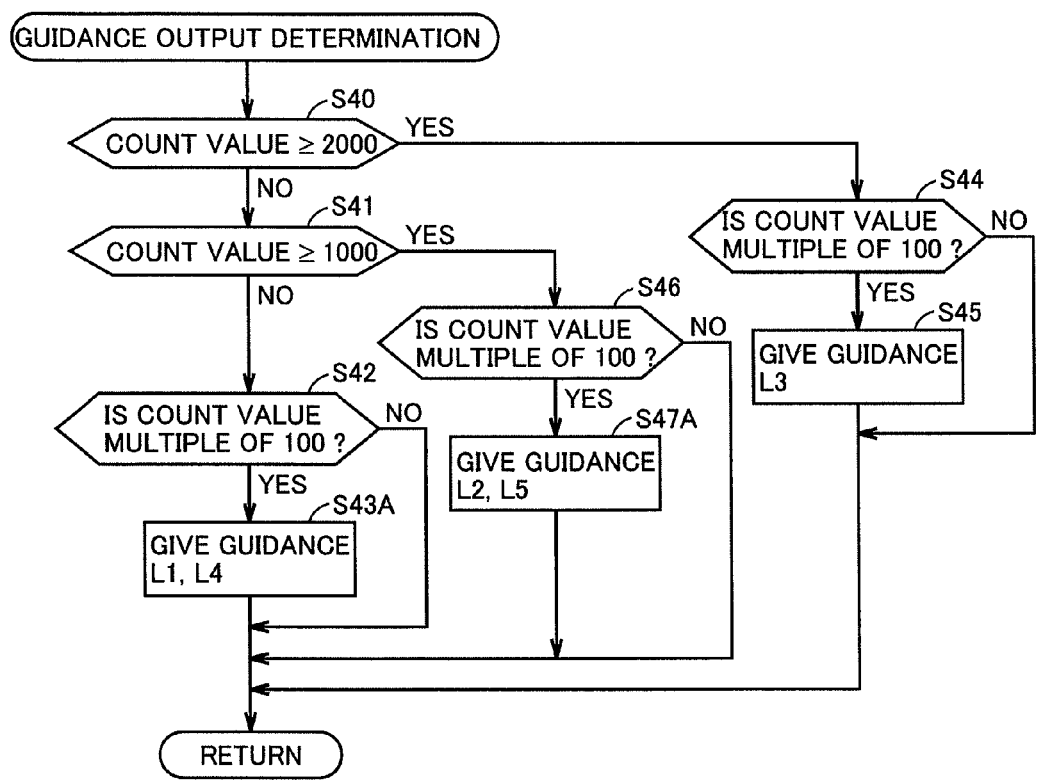
FIG. 20 is a flowchart illustrating details of guidance output determination processing based on the second embodiment.

FIG. 20 is a flowchart of the guidance output determination processing based on the second embodiment. The processing is processing mainly in notification portion 58.

As shown in FIG. 20, as compared with the guidance output determination processing described with reference to FIG. 12, difference resides in that step S43 is replaced with step S43A and step S47 is replaced with step S47A. Since processing is otherwise the same as described with reference to FIG. 12, detailed description thereof will not be repeated.

When notification portion 58 has determined in step S46 that the count value is a multiple of 100 (YES in step S46), guidance L2, L5 is given (step S47A). Then, the process ends (return).

When notification portion 58 determines in step S42 that the count value is a multiple of 100 (YES in step S42), guidance L1, L4 is given (step S43A). Then, the process ends (return).

In the processing, when the count value is smaller than 1000, notification portion 58 gives guidance L1, L4 each time a multiple of 100 is attained. Therefore, notification portion 58 gives guidance L1, L4 9 times by the time when the count value attains to 1000. Similarly, when the count value is smaller than 2000, notification portion 58 gives guidance L2, L5 each time a multiple of 100 is attained. Therefore, notification portion 58 gives guidance L2, L5 10 times by the time when the count value attains to 2000. Then, even after the count value attains to 2000, notification portion 58 gives guidance L3 each time a multiple of 100 is attained.

FIG. 21 is a diagram illustrating guidance information based on the second embodiment.

As shown in FIG. 21, the guidance information is stored in notification condition storage portion 59A.

Guidance information stored in notification condition storage portion 59A is different from the guidance information described with reference to FIG. 13 in that guidance L4, L5 is further added.

In the present example, message contents given in correspondence with guidance L1 to L5 are allocated. Specifically, guidance L4 is "Turning on of deceleration switch is recommended." Guidance L5 is "Please turn on deceleration switch." As described above, with regard to guidance L1 to L3, a degree of urging check and maintenance of engine 36 is increased stepwise. In addition, with regard to guidance L4, L5, turning on of the deceleration switch is recommended and a degree of recommendation is increased stepwise.

With the processing, with increase in the number of times of stop of the engine which is the count value, that is, in accordance with a degree of load on engine 36, contents of guidance information can be changed for notification.

In addition, by presenting to the operator, turning on of the deceleration switch with change in the count value, the operator can be invited to perform an operation less likely to impose load on engine 36.

Moreover, though a case where guidance is given to the operator each time a multiple of 100 is attained such that notification is comfortable and necessary for the operator has been described in the present example, limitation to such a scheme is not particularly intended, and the number of times of calling for attention can also be increased by giving notification each time. Furthermore, the number of times can also be increased stepwise.

FIG. 22 is a diagram illustrating an example of display on monitor apparatus 21 in accordance with the guidance information based on the second embodiment.

As shown in FIG. 22, here, a display screen displayed on monitor apparatus 21 during a normal idling stop operation is shown.

As shown in FIG. 22 (A), a pop-up screen is displayed, and together with words "during idling stop," display of "please turn off key in order to prevent battery from running off" is given to the operator, which is the same as in FIG. 14 (A).

As shown in FIG. 22 (B), here, a pop-up screen is displayed, and together with words "during idling stop," display of "Please turn on deceleration switch" is given to the operator together with the display of "The number of times of stop from high idling state has attained to X. After working ends, please carry out engine check and maintenance as necessary."

With such display, guidance information on check and maintenance of engine 36 can be given to the operator in an appropriate form. In addition, by recommending turning on of the deceleration switch, notification to invite the operator to perform an operation less likely to impose load on engine 36 can be given.

Though a case where guidance information is given through display has been described in the present example by way of example, limitation to display is not particularly intended, and notification to the operator can be given also through voice and sound, vibration, or the like.

In idling control according to the second embodiment, the number of times of stop of engine 36 from the high idling state is counted and the longest idling stop time period is set when the number of times of stop is equal to or greater than a prescribed number of times. With such processing, when the number of times of stop from the high idling state is equal to or greater than a prescribed number of times, the number of times of the idling stop operation performed (the number of times of stop of engine 36) can be suppressed, load imposed on engine 36 can be mitigated, and durability of engine 36 can be improved.

<Deceleration Function Activation Setting Processing>

In the second embodiment, when the count value of counting portion 53 is equal to or greater than a prescribed number of times, control is carried out such that the deceleration operation in deceleration control unit 62 is automatically performed.

Specifically, deceleration ON/OFF setting portion 65 sets the deceleration function to active based on the count value of counting portion 53.

Figure 23:
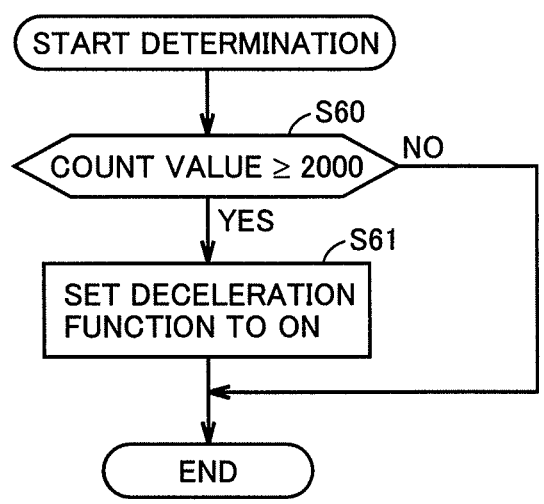
FIG. 23 is a flowchart illustrating processing in a deceleration ON/OFF setting portion 65 based on the second embodiment.

FIG. 23 is a flowchart in deceleration ON/OFF control processing by deceleration ON/OFF setting portion 65 based on the second embodiment.

As shown in FIG. 23, deceleration ON/OFF setting portion 65 determines whether or not the count value from counting portion 53 is equal to or greater than a prescribed number of times (not smaller than 2000 by way of example) (step S60).

When deceleration ON/OFF setting portion 65 has determined in step S60 that the count value is equal to or greater than 2000 (YES in step S60), it sets the deceleration function to ON (step S61). Then, the process ends (return).

When deceleration ON/OFF setting portion 65 has determined in step S60 that the count value is smaller than 2000 (NO in step S60), step S61 is skipped and the process ends (end).

In the present example, by way of example, when the count value of counting portion 53 is equal to or greater than the prescribed number of times, that is, when the number of times of stop of engine 36 in the high idling state is equal to or greater than the prescribed number of times, the deceleration function is turned on. With such processing, execution of the idling stop operation from the high idling state can be suppressed, load imposed on engine 36 can be mitigated, and durability of engine 36 can be improved.

(Variation of Second Embodiment)

Though a scheme that stop determination portion 55A in the second embodiment above counts the number of times of stop by the idling stop operation when the deceleration function is set to inactive has been described, it can also be combined with rotation information on the number of rotations of engine 36 in the first embodiment.

Figure 24:
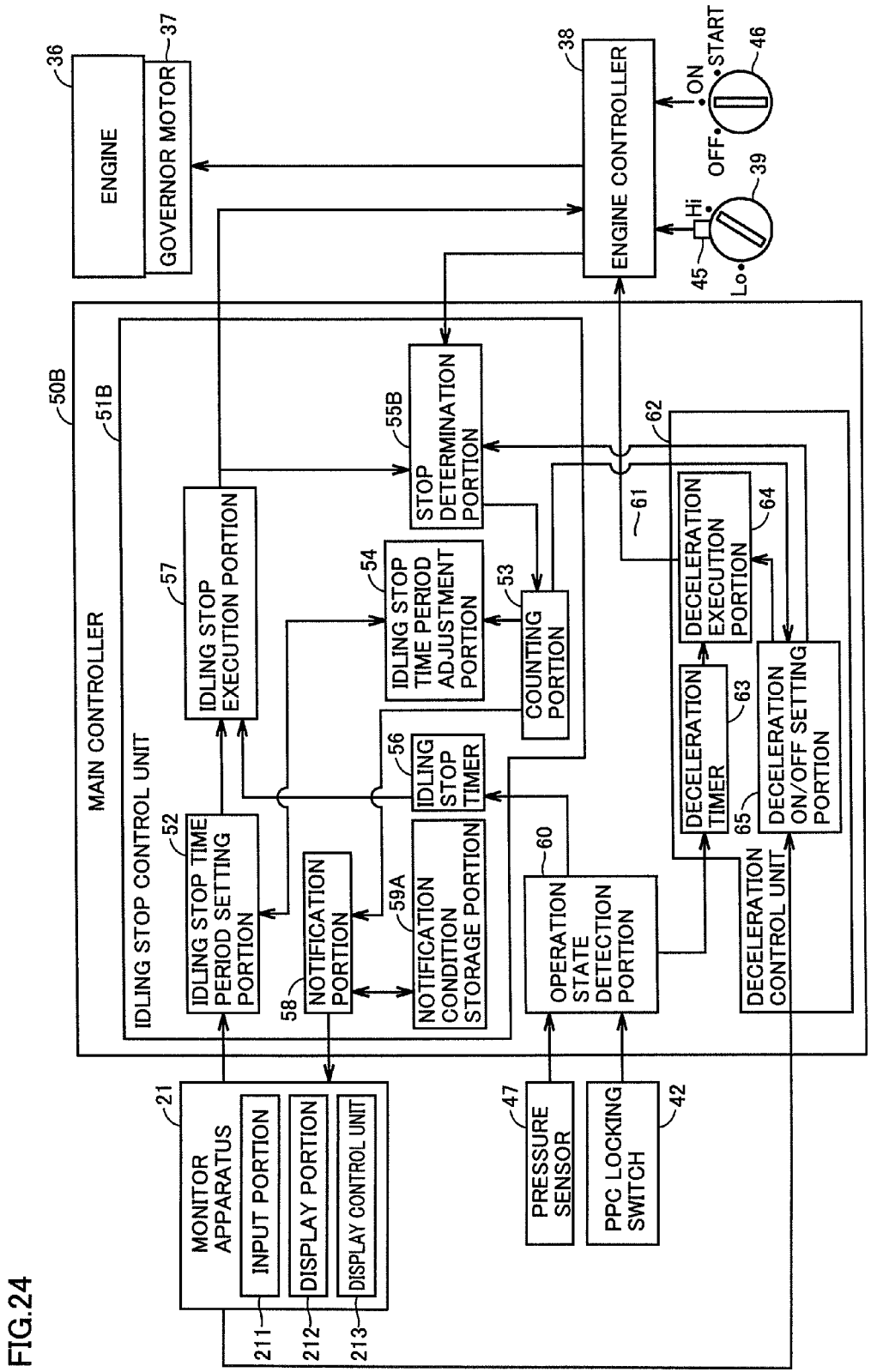
FIG. 24 is a functional block diagram illustrating an idling function of a main controller 50B in a control system of work vehicle 101 based on a variation of the second embodiment.

FIG. 24 is a functional block diagram illustrating an idling function of a main controller 50B in a control system of work vehicle 101 based on a variation of the second embodiment.

As shown in FIG. 24, main controller 50B is different from main controller 50A described in the second embodiment above in that idling stop control unit 51A is replaced with an idling stop control unit 51B. Idling stop control unit 51B is different from idling stop control unit 51A in that stop determination portion 55A is replaced with a stop determination portion 55B. Since features are otherwise the same as described above, detailed description thereof will not be repeated.

Stop determination portion 55B based on the variation of the second embodiment determines whether or not engine 36 stops from the high idling state in response to the engine stop signal output from idling stop execution portion 57. Here, stop from the "high idling state" means that engine 36 stops from the number of rotations higher than the prescribed number of rotations. Specifically, stop determination portion 55B determines whether or not engine 36 stops in response to the engine stop signal, based on information on whether the deceleration function is active/inactive and on information on the number of rotations of engine 36.

When stop determination portion 55B has determined that engine 36 has stopped from the high idling state, it outputs the determination to that effect to counting portion 53.

Based on a result of determination by stop determination portion 55B, counting portion 53 increments as a counter value, the number of times of stop of engine 36 (the number of times of stop of engine 36) from the high idling state by the idling stop operation based on the engine stop signal.

A counter value of counting portion 53 is output to idling stop time period adjustment portion 54. In addition, a counter value of counting portion 53 is output to notification portion 58.

Idling stop time period adjustment portion 54 adjusts an idling stop time period which is a condition for performing the idling stop operation when the counter value (the number of times of stop of engine 36) counted by counting portion 53 is equal to or greater than the prescribed number of times. Specifically, when the counter value of counting portion 53 is equal to or greater than the prescribed number of times, idling stop time period adjustment portion 54 instructs idling stop time period setting portion 52 to adjust the idling stop time period to a long time period.

Notification portion 58 gives guidance information based on the counter value from counting portion 53 (the number of times of stop of engine 36). The "guidance information" is prescribed information which can be made use of by the operator, and it is, for example, information inviting the operator to take a prescribed action. By way of example, information urging check and maintenance of the work vehicle can be exemplified.

Notification condition storage portion 59A stores a counter value and guidance information to be given in accordance with the counter value, in correspondence with each other.

Notification portion 58 reads guidance information corresponding to the counter value by referring to notification condition storage portion 59A, and outputs the guidance information to monitor apparatus 21. Upon receiving the guidance information from notification portion 58, monitor apparatus 21 displays the guidance information on display portion 212.

Figure 25:
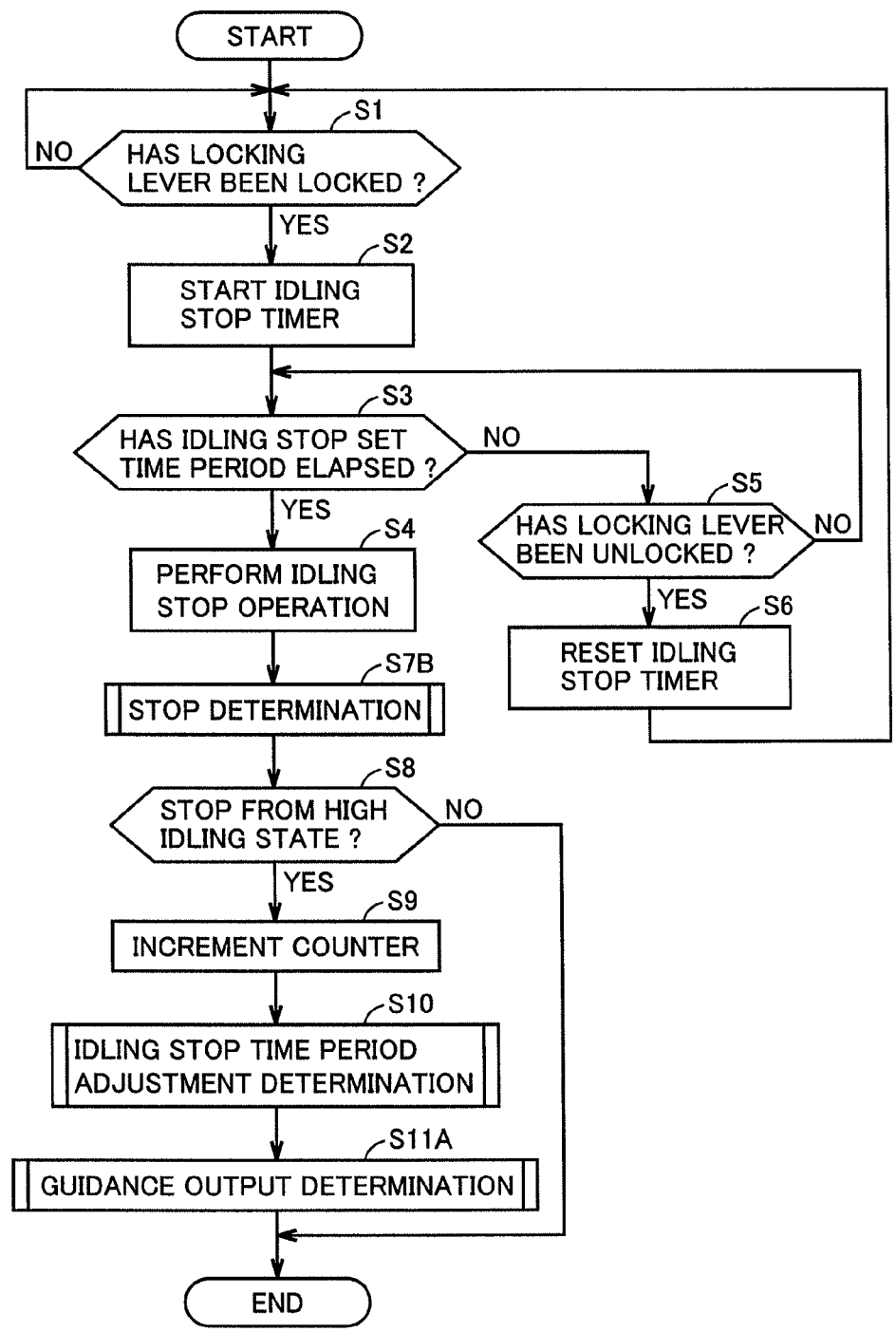
FIG. 25 is a diagram illustrating a main control flow of an idling stop control unit 51B based on the variation of the second embodiment.

FIG. 25 is a flowchart of a main control procedure in idling stop control unit 51B based on the variation of the second embodiment.

As shown in FIG. 25, as compared with the flowchart of the main control processing in FIG. 18, difference resides in replacement with stop determination processing in step S7B. Since a flow of processing is otherwise the same as in the flowchart described with reference to FIG. 18, detailed description thereof will not be repeated.

When the idling stop operation is performed in step S4, idling stop control unit 51B then performs stop determination processing (step S7B). The "stop determination processing" is processing for determining whether or not engine 36 has stopped and details of the processing for making determination will be described later.

<Stop Determination Processing>

Figure 26:
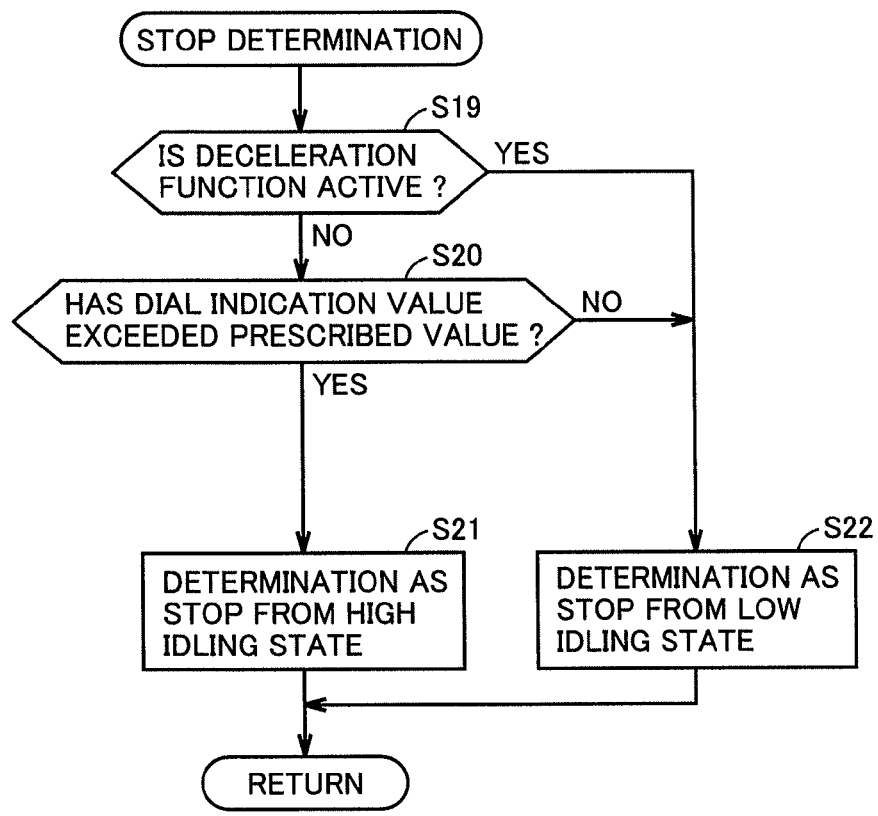
FIG. 26 is a flowchart illustrating details of stop determination processing based on the variation of the second embodiment.

FIG. 26 is a flowchart of the stop determination processing based on the variation of the second embodiment. The processing is processing mainly in stop determination portion 55B. The stop determination processing is processing for determining whether or not stop has been made from the high idling state in which the number of rotations of engine 36 in the idling state is high. In the present example, stop determination portion 55B determines whether the high idling state or the low idling state has been established based on information on the deceleration function being active/inactive and information on the number of rotations of engine 36. In addition, a dial indication value in accordance with such an amount of operation of fuel dial 39 as setting the number of rotations of engine 36 to the prescribed number of rotations (1000 rpm) is set as a prescribed value serving as a criterion for determining whether or not engine 36 is in the high idling state, and whether the high idling state or the low idling state has been established is determined based on whether or not the prescribed value has been exceeded.

As shown in FIG. 26, stop determination portion 55B in the present example makes use of a dial indication value with regard to the number of rotations of engine 36, as information on the deceleration function being active/inactive and rotation information on the number of rotations of engine 36, by way of example. Stop determination portion 55B determines whether the deceleration function is active or inactive (step S19). Specifically, stop determination portion 55B determines whether the deceleration function is active or inactive in response to an instruction from deceleration ON/OFF setting portion 65. By way of example, when deceleration switch 111 is ON, determination as the deceleration function being active is made. On the other hand, when deceleration switch 111 is OFF, determination as the deceleration function being inactive is made.

When stop determination portion 55B has determined in step S19 that the deceleration function is active (YES in step S19), determination as stop from the low idling state is made (step S22). This is because the deceleration function is active and hence engine 36 stops from the low idling state.

Then, the process ends (return).

On the other hand, when stop determination portion 55B has determined in step S19 that the deceleration function is inactive (NO in step S19), it determines whether or not a dial indication value input through engine controller 38 has exceeded a prescribed value (step S20).

Then, when stop determination portion 55B has determined in step S20 that the dial indication value has exceeded the prescribed value (YES in step S20), determination as stop from the high idling state is made (step S21).

Then, the process ends (return).

On the other hand, when stop determination portion 55B has determined in step S20 that the dial indication value is equal to or smaller than the prescribed value (NO in step S20), determination as stop from the low idling state is made (step S22).

Then, the process ends (return).

When determination as stop from the high idling state has been made in the stop determination processing, the count value of counting portion 53 is incremented.

Therefore, the number of times of stop of the engine in a case where determination as stop from the high idling state is made can be counted, with a case where engine 36 is determined to stop from the low idling state with the scheme based on the variation of the second embodiment being excluded. Namely, by counting only the number of times of stop in such a situation that load is imposed with the number of times of stop in such a situation that load imposed on the engine is low being excluded, a degree of load imposed on the engine can accurately be ascertained.

Then, in the scheme based on the variation of the second embodiment, in determining whether or not the high idling state has been established, initially, whether the deceleration function is active or inactive is determined, and when it is active, determination as stop from the low idling state is made.

Therefore, when the deceleration function is active, determination as the low idling state is made without making use of rotation information on the number of rotations of engine 36, so that the determination processing can be performed faster. Then, when the deceleration function is inactive, whether stop is made from the high idling state or from the low idling state is determined based on the rotation information on the number of rotations of engine 36, and hence accurate determination processing can be performed.

Then, in idling control according to the variation of the second embodiment, the number of times of stop of engine 36 from the high idling state is counted, and when the number of times of stop is equal to or greater than the prescribed number of times, the longest idling stop time period is set. With such processing, when the number of times of stop from the high idling state is equal to or greater than the prescribed number of times, the number of times of the idling stop operation performed (the number of times of stop of engine 36) can be suppressed, load imposed on engine 36 can be mitigated, and durability of engine 36 can be improved.

In addition, when the count value of counting portion 53 is equal to or greater than the prescribed number of times, that is, when the number of times of stop of engine 36 in the high idling state is equal to or greater than the prescribed number of times, the deceleration function is turned on. With such processing, execution of the idling stop operation from the high idling state can be suppressed, load imposed on engine 36 can be mitigated, and durability of engine 36 can be improved.

Though a hydraulic excavator has been described by way of example of a work vehicle in the present example, application also to such a work vehicle as a bulldozer or a wheel loader is possible, and application to any work machine provided with engine 36 is possible.

Though the embodiments of the present invention have been described above, it should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST

1 lower carrier; 2 revolving mechanism; 3 upper revolving unit; 4 work implement; 5 boom; 6 arm; 7 bucket; 8 operator's cab; 9 operator's seat; 10 travel operation portion; 11, 12 travel lever; 13, 14 travel pedal; 15 pedal for attachment; 16 side window; 17 dashboard; 18, 19 work implement lever; 20 locking lever; 21 monitor apparatus; 22 front window; 23 vertical frame; 31A first hydraulic pump; 31B second hydraulic pump; 32 swash plate drive apparatus; 33 pump controller; 34 control valve; 35 hydraulic actuator; 36 engine; 37 governor motor; 38 engine controller; 39 fuel dial; 40 rotation sensor; 41 work implement lever apparatus; 42 PPC locking switch; 43 valve; 45 potentiometer; 46 starter switch; 47 pressure sensor; 50, 50A, 50B main controller; 51, 51A, 51B idling stop control unit; 52 idling stop time period setting portion; 53 counting portion; 54 idling stop time period adjustment portion; 55, 55A, 55B stop determination portion; 56 idling stop timer; 57 idling stop execution portion; 58 notification portion; 59, 59A notification condition storage portion; 60 operation state detection portion; 61 rotation command output portion; 62 deceleration control unit; 63 deceleration timer; 64 deceleration execution portion; 65 deceleration ON/OFF setting portion; 101 work vehicle; 111 deceleration switch; 112 operation mode selection switch; 113 travel speed position selection switch; 114 buzzer cancellation switch; 115 wiper switch; 116 washer switch; 117 air-conditioner switch; 211 input portion; 212 display portion; 213 display control unit; 301 standard picture; 302 operation mode selection picture; 310 vehicular body setting picture; 315, 325 cursor; and 320 idling stop time period setting picture.

The invention claimed is:

1. A work vehicle, comprising:
   an engine capable of rotating in a first idling state in which the engine rotates at a prescribed number of rotations and a second idling state in which the engine rotates at the number of rotations higher than said prescribed number of rotations;
   an idling stop execution portion for performing an idling stop operation for stopping said engine when said first idling state or said second idling state has continued for a prescribed time period;
   a determination portion for determining whether stop has been made from said second idling state by said idling stop operation, based on rotation information on the number of rotations of said engine;
   a counting portion for counting the number of times of stop of said engine from said second idling state, based on a result of determination by said determination portion; and
   an idling stop time period adjustment portion for making said prescribed time period of said second idling state, which is a condition for performing said idling stop operation, longer than a current time period, when the number of times of stop of said engine counted by said counting portion is equal to or greater than a prescribed number of times.

2. The work vehicle according to claim 1, wherein
said determination portion determines whether said engine has stopped from said second idling state by said idling stop operation, based on whether an indication value in accordance with an amount of operation of an adjustment dial with which the number of rotations of said engine can be adjusted has exceeded a prescribed value.

3. The work vehicle according to claim 1, further comprising an idling stop time period setting portion for setting said prescribed time period from a setting range from which selective setting can be made, wherein
said idling stop time period adjustment portion sets said prescribed time period to a longest time period within said setting range when the number of times of stop of said engine counted by said counting portion is equal to or greater than said prescribed number of times.

4. The work vehicle according to claim 1, further comprising a notification portion for giving guidance information on said engine based on the number of times of stop of the engine counted by said counting portion.

5. The work vehicle according to claim 4, wherein
said notification portion gives said guidance information with contents thereof being changed in accordance with increase in the number of times of stop of said engine counted by said counting portion.

6. The work vehicle according to claim 1, further comprising:
a deceleration execution portion for performing a deceleration operation for setting the number of rotations of said engine to the number of rotations lower than in said second idling state, in accordance with continuation of a non-working state; and
a deceleration setting portion capable of setting a function of said deceleration operation to active or inactive, wherein
said determination portion determines whether said engine has stopped from said second idling state by said idling stop operation, based on rotation information on the number of rotations of said engine, when said deceleration setting portion has set the function of said deceleration operation to inactive.

7. The work vehicle according to claim 6, wherein
said deceleration setting portion sets the function of said deceleration operation to active when the number of times of stop of the engine counted by said counting portion has exceeded said prescribed number of times.

8. A work vehicle, comprising:
an engine capable of rotating in a first idling state in which the engine rotates at a prescribed number of rotations and a second idling state in which the engine rotates at the number of rotations higher than said prescribed number of rotations;
a deceleration execution portion for performing a deceleration operation for setting the number of rotations of said engine to the number of rotations in said first idling state in accordance with continuation of a non-working state;
an idling stop execution portion for performing an idling stop operation for stopping said engine when said first idling state or said second idling state has continued for a prescribed time period;
a deceleration setting portion capable of setting a function of said deceleration operation to active or inactive;
a determination portion for determining whether said engine has been stopped by said idling stop operation, when the function of said deceleration operation has been set to inactive by said deceleration setting portion;
a counting portion for counting the number of times of stop of said engine from said second idling state, based on a result of determination by said determination portion; and
an idling stop time period adjustment portion for making said prescribed time period of said second idling state, which is a condition for performing said idling stop operation, longer than a current time period, when the number of times of stop of said engine counted by said counting portion is equal to or greater than a prescribed number of times.

9. The work vehicle according to claim 8, further comprising an idling stop time period setting portion for setting said prescribed time period from a setting range from which selective setting can be made, wherein
said idling stop time period adjustment portion sets said prescribed time period to a longest time period within said setting range when the number of times of stop of said engine counted by said counting portion is equal to or greater than said prescribed number of times.

10. The work vehicle according to claim 8, further comprising a notification portion for giving guidance information based on the number of times of stop of said engine counted by said counting portion.

11. The work vehicle according to claim 10, wherein
said notification portion gives said guidance information with contents thereof being changed in accordance with increase in the number of times of stop of said engine counted by said counting portion.

12. The work vehicle according to claim 8, wherein
said deceleration setting portion sets the function of said deceleration operation to active when the number of times of stop of the engine counted by said counting portion has exceeded said prescribed number of times.

* * * * *